United States Patent [19]
DeMoss et al.

[11] Patent Number: 5,778,411
[45] Date of Patent: Jul. 7, 1998

[54] METHOD FOR VIRTUAL TO PHYSICAL MAPPING IN A MAPPED COMPRESSED VIRTUAL STORAGE SUBSYSTEM

[75] Inventors: Robert A. DeMoss; Donald R. Humlicek, both of Wichita, Kans.

[73] Assignee: Symbios, Inc., Fort Collins, Colo.

[21] Appl. No.: 933,327

[22] Filed: Sep. 18, 1997

Related U.S. Application Data

[63] Continuation of Ser. No. 441,866, May 16, 1995, abandoned.

[51] Int. Cl.$^6$ .................................................. G06F 12/10
[52] U.S. Cl. ............................ 711/4; 711/112; 711/203; 395/888
[58] Field of Search ........................... 711/4, 112, 203; 395/888

[56] References Cited

U.S. PATENT DOCUMENTS

| | | | |
|---|---|---|---|
| 5,214,695 | 5/1993 | Arnold et al. | 395/934 |
| 5,247,638 | 9/1993 | O'Brien | 395/888 |
| 5,276,840 | 1/1994 | Yu | 395/855 |
| 5,471,604 | 11/1995 | Hasbun et al. | 711/4 |
| 5,479,638 | 12/1995 | Assar et al. | 711/103 |
| 5,581,743 | 12/1996 | Burton et al. | 711/112 |

OTHER PUBLICATIONS

Prasad, N.S., "IBM Mainframes Architecture and Design-";Intertext Publications, McGraw–Hill Book Company, 1989; pp. 287–299.

Tannenbaum, Andrew S.; Operating Systems: Design and Implementation; 1987; pp. 258–261, 300–305.

*Primary Examiner*—Eddie P. Chan
*Assistant Examiner*—Reginald G. Bragdon
*Attorney, Agent, or Firm*—Daniel N. Fishman; Wayne P Bailey

[57] ABSTRACT

A method and corresponding controller apparatus for creating, updating and maintaining mapping information in a virtual mass storage subsystem. A request to manipulate a virtual block or cluster identifies a particular virtual block number. The virtual block number is mapped to a first physical block number by a direct calculation. A header data structure contained in the first physical block contains mapping information to locate other physical blocks associated with the virtual cluster. In addition to the header data structure, the first physical block contains a portion of the stored data for the corresponding virtual cluster. Additional physical blocks which stored the data of the virtual cluster are located from the mapping information in the header of the first physical block. The methods of the present invention provide improved performance and reduced buffer memory requirements in the virtual mass storage controller circuits of the subsystem as compared to prior approaches.

28 Claims, 10 Drawing Sheets

5,778,411

METHOD FOR VIRTUAL TO PHYSICAL MAPPING IN A MAPPED COMPRESSED VIRTUAL STORAGE SUBSYSTEM

RELATED APPLICATION

The present patent application is a continuation of U.S. application having Ser. No. 08/441,866, filed May 16, 1995, entitled METHOD FOR VIRTUAL TO PHYSICAL MAPPING IN A MAPPED VIRTUAL STORAGE SUBSYSTEM, which is now abandoned.

FIELD OF THE INVENTION

This invention relates to a data storage subsystems and in particular to a virtual data storage subsystem in which virtual blocks of data referenced by a host computer system are mapped to, and stored in, blocks on physical storage devices within the virtual data storage subsystem. More particularly, the present invention relates to storing virtual blocks of data in compressed form on blocks of physical storage devices within the virtual data storage subsystem.

BACKGROUND OF THE INVENTION

Modern mass storage subsystems are continuing to provide increasing storage capacities to fulfill user demands from host computer system applications. Due to this critical reliance on large capacity mass storage, demands for enhanced reliability are also high. Various storage device configurations and geometries are commonly applied to meet both the demands for higher storage capacity while maintaining or enhancing reliability of the mass storage subsystems.

A popular solution to these mass storage demands for increased capacity and reliability is the use of multiple smaller storage modules configured in geometries that permit redundancy of stored data to assure data integrity in case of various failures. In many such redundant subsystems, recovery from many common failures can be automated within the storage subsystem itself due to the use of data redundancy, error codes, and so-called "hot spares" (extra storage modules which may be activated to replace a failed, previously active storage module). These subsystems are typically referred to as redundant arrays of inexpensive disks (or more commonly by the acronym RAID). RAID storage subsystems typically utilize a control module that shields the user or host system from the details of managing the redundant array. The controller makes the subsystem appear to the host computer as a single, highly reliable, high capacity disk drive. In fact, the RAID controller may distribute the host computer system supplied data across a plurality of the small inexpensive drives with redundancy and error checking information so as to improve subsystem reliability.

To the extent that the mass storage subsystem hides from the host computer system the details of the physical storage of data, the subsystem is often referred to as a virtual storage subsystem. The virtual mass storage subsystem appears to the host computer system as a large capacity, block oriented, random access, storage device with storage blocks linearly addressed by a block number. Host computer systems store and retrieve information in the mass storage subsystem by referring to a virtual block number associated with each virtual block of information stored in the mass storage subsystem then sending or receiving the data associated with that block number.

To hide physical storage structure in the RAID array from the host computer system, the storage subsystem controller must map the virtual block numbers provided by a host computer system into physical storage modules and physical blocks within those physical storage modules. If this mapping information is stored in semiconductor memory within the storage controller, large amounts of relatively expensive semiconductor memory may be required. U.S. Pat. No. 5,247,638 (issued Sep. 21, 1993 to O'Brien et al.) is exemplary of such a virtual storage subsystem in which a virtual track directory is maintained in semiconductor memory within the storage subsystem controller. This large semiconductor memory buffer used to store directory and mapping information provides rapid access to the mapping information. However, such large memory arrays can be prohibitively expensive in the lower cost end of the market spectrum. In addition, if the memory is volatile memory (such as typical DRAMs), then the large volumes of directory information is lost in the case of a power failure or other malfunction. The semiconductor memory devices may be of the non-volatile type to prevent loss of directory information on occurrence of a power loss, but this adds even more cost to the virtual mass storage subsystem controller.

Other approaches have stored the mapping information in reserved areas of the physical storage devices. This approach reduces the requirement for large amounts of relatively expensive semiconductor memory to perform the virtual to physical mapping function. Storing the directory information on the physical storage devices also provides immunity to loss of directory information as a result of power loss. However, such prior approaches dramatically reduce the overall performance of the mass storage subsystem by increasing the number of accesses to the relatively slow physical storage modules (i.e. disk drives). A host computer system request to access a particular virtual block number requires a read of the physical storage modules containing the virtual to physical mapping or directory information. Once the mapping information is located, the proper physical storage blocks appropriate to the host computer system request may then be accessed. Depending upon the size of the virtual block relative to the physical block size containing the mapping information, the extra access to the physical storage modules may represent a significant penalty in the overall performance of the virtual storage subsystem.

It is also known in virtual mass storage subsystems to compress the data supplied by a host computer system before storing it on the physical blocks of the physical storage modules of the subsystem. O'Brien et al. also teach the use of a compression apparatus to compress the data received from a host computer before storing it in the physical disk drives of the array. Conversely, compressed data from the physical disk drives of O'Brien's array is uncompressed in the controller before being sent back to a requesting host computer system. This compression of the physical data serves to further reduce the size of the disk access requested by a host computer system relative to the "overhead" disk access which would be required of disk based storage of the virtual mapping information.

Well known caching techniques which use some semiconductor memory (faster memory) to speed up frequent accesses to the physical storage modules (slower memory) may relieve this problem somewhat but cannot assure improvements in all cases.

These known prior approaches share a common feature in that they use memory table lookup functions to map a host supplied virtual block request to a physical block. The memory for the table lookup function may comprise semiconductor memory devices which imposes a significant cost in the volume of expensive memory needed for the lookup table (i.e. virtual track directory). Alternatively, the memory for the table lookup may be a reserved area of the physical storage modules within the mass storage subsystem which imposes performance limitations on the mass storage subsystem due to the access time of the relatively slow physical storage devices when mapping a virtual block to a physical block.

It is apparent from the above discussion that there exists a need for an improved method of mapping virtual storage locations (virtual block numbers) of a mass storage subsystem to physical storage locations (physical block numbers) in the physical storage devices which make up the mass storage subsystem. This need is more acute when the virtual mass storage subsystem compresses the data before writing it to the physical storage modules and the mapping information is stored in reserved areas of the physical storage devices.

SUMMARY OF THE INVENTION

The present invention solves the above described problems and thereby achieves a technical advance in the art by providing a new method for generating, maintaining, and storing virtual to physical mapping information in a virtual mass storage subsystem. The present invention comprises methods which directly computes the first physical block used to store a portion of the virtual block supplied by a host computer system. The methods of the present invention then store mapping information regarding the remainder of the physical blocks (if any) associated with the host supplied virtual block number in a header portion of the first physical block. The data comprising the virtual block is then stored in the physical blocks associated with the virtual block number, including the remainder of the first physical block which follows the header portion.

In response to a request from a host computer system to access a particular virtual block number, the controller of the virtual mass storage subsystem of the present invention computes the first physical block number which is associated with the requested virtual block number. The first physical block number is also referred to herein as the "home block." This mapping of virtual block number to first physical block number is a fixed equation which may be easily computed. This computational approach to mapping the virtual block number to the first physical block number solves problems of the earlier approaches. O'Brien et al. taught the use of a large virtual track directory structure stored in semiconductor memory associated with the subsystem controller. The computational approach of the present invention does not require this large, costly, memory buffer for a virtual track directory. Rather the first physical block number is directly computed given the host computer system's requested virtual block number. Other prior approaches avoided the costs of a large virtual to physical directory structure in semiconductor memory by storing the virtual track directory in reserved areas of the physical storage modules. These other prior approaches required additional access to the physical storage modules to obtain the directory information prior to the physical storage modules access requested by the host computer system. The computational approach of the present invention for mapping a virtual block number to the first physical block number eliminates the time consuming additional access of the physical storage modules for directory information to map the virtual block number to a first physical block number to thereby improve subsystem performance.

Host computer systems typically initiate requests for exchange of information with mass storage subsystems in units of multiple virtual blocks referred to herein as "virtual clusters." The virtual blocks in a virtual cluster are related by some functional or content association meaningful to the host computer systems such that they are frequently accessed together. For example, portions of a stored file may be stored in multiple virtual blocks of a virtual cluster (the entire file may comprise multiple such virtual clusters). The methods of the present invention logically organize physical blocks on the storage devices into "physical clusters" of a fixed number of associated physical blocks. The number of physical blocks in a physical cluster is selected so that the aggregate size of the physical blocks in a physical cluster is large enough to store the typical size of a virtual cluster which is mapped to it (after data compression if compression techniques are utilized as discussed below).

As noted above, the methods of the present invention locate the first physical block used to store the data of the virtual cluster by direct calculation using the first virtual block number of the virtual cluster to be exchanged with the host computer system. The physical cluster containing the first physical block contains mapping information used to locate other physical blocks used to store the requested virtual cluster. The methods of the present invention locate subsequent physical blocks storing latter portions of the virtual block by inspecting the header information stored in a portion of the home block located by direct calculation using the requested virtual block number. The header comprises information regarding the remaining physical block numbers (if any) associated with the virtual block. Since the first physical block must typically be accessed for any host computer request directed to a particular virtual block, no extra overhead is incurred to access the physical storage modules either to locate the first physical storage block or to locate subsequent physical storage blocks used to store the virtual block data. In addition, it is common that the additional physical blocks used to store the virtual cluster are contained in the same physical cluster as the home block. The methods of the present invention therefore read not only the first physical block when reading information, but rather the entire physical cluster which contains the home block. This optimization improves the overall performance of the virtual mass storage subsystem by anticipating the likely use of the other physical blocks in the physical cluster containing the home block. The methods of the present invention therefore often read the entire requested virtual cluster by reading the entire physical cluster containing the home block (located by simple calculations from the host request).

The methods of the present invention are further adaptable to be utilized in conjunction with a variety of data compression apparatus and methods. The header data structure encoded in the first physical block mapped to a virtual block number may contain information regarding the compressed data size of the virtual block and information specific to the type of compression utilized for the virtual block data. The header data structure may specify no compression if the compression methods are unable to effectively compress the host supplied data or if data compression is not utilized in the current virtual mass storage subsystem configuration.

Other aspects of the methods of the present invention determine the allocation of physical blocks in physical cluster for storage of associated virtual clusters. When possible, physical blocks within the same physical cluster as the home block are allocated to store the data of an associated virtual cluster. If the storage capacity of the available physical blocks in that physical cluster is insufficient to store the entire virtual cluster, then additional available physical blocks are allocated from other physical clusters. These physical blocks allocated from other physical clusters are referred to herein as "overflow blocks." Tables are generated and maintained by the methods of the present invention to record which physical blocks are allocated (block allocation table) and to note that overflow blocks have been allocated for storage of a virtual cluster in an associated physical cluster (overflow table). In addition, an overflow table entry is set corresponding to the other physical cluster from which overflow blocks were allocated. The block allocation and overflow tables are used by the methods of the present invention to enhance the performance of the virtual mass storage subsystem.

It is therefore an object of the present invention to provide a method of storing information onto physical storage modules in a virtual mass storage subsystem while reducing the requirements for semiconductor memory in the mass storage control electronics.

It is another object of the present invention to provide a method of storing information in a virtual mass storage subsystem onto physical storage modules while reducing the overhead access to the physical storage modules required for access to directory information to map virtual addresses into physical addresses.

It is another object of the present invention to provide a method for directly mapping a virtual cluster to a first physical block by a direct computation.

It is still another object of the present invention to store mapping information for additional physical blocks required to store a virtual cluster in a first physical block directly locatable by identifying the virtual cluster to be manipulated.

It is still another object of the present invention to permit a variety of data compression techniques to be utilized in conjunction with the virtual mass storage methods.

DETAILED DESCRIPTION OF THE INVENTION

Overview

Figure 1:
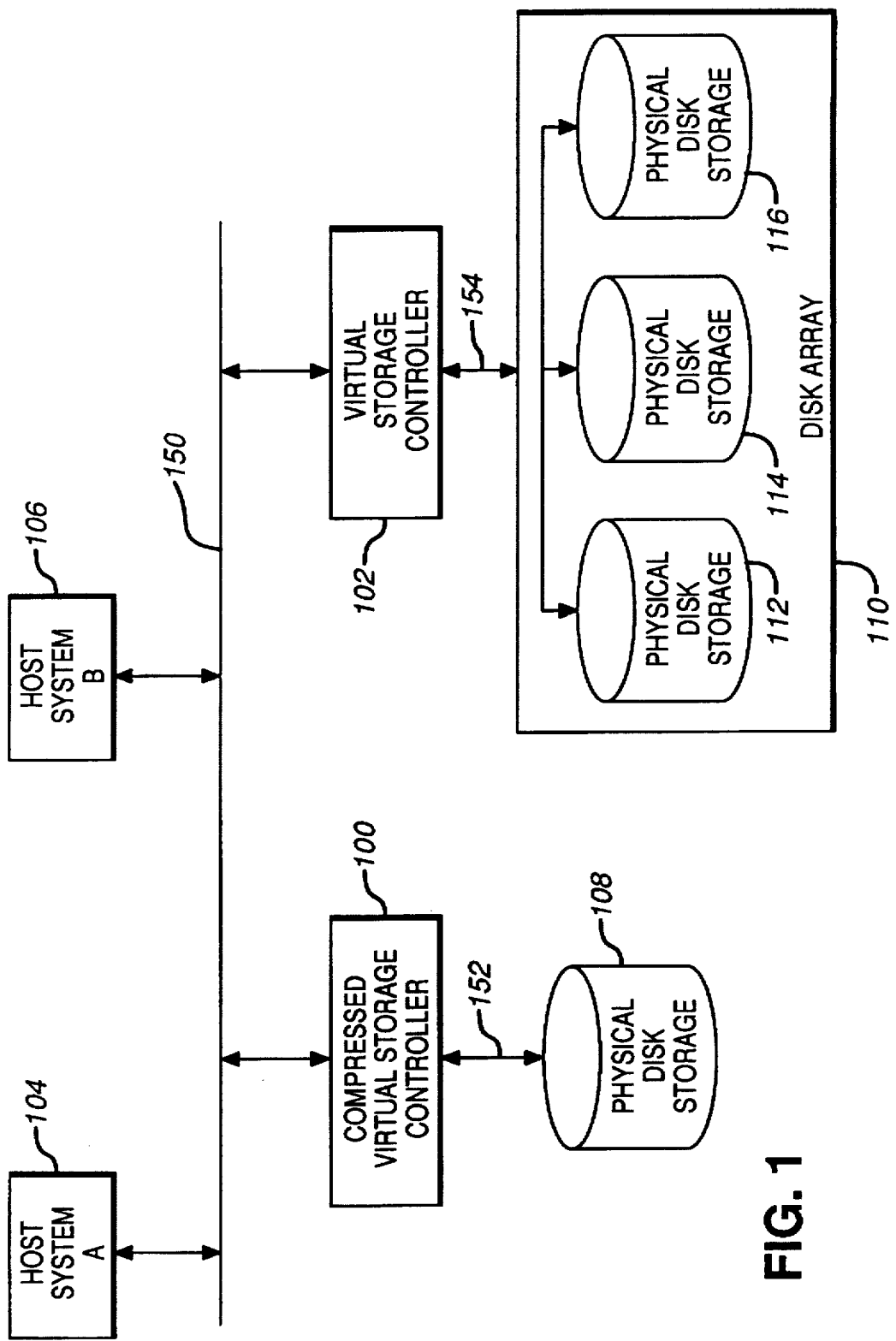
FIG. 1 depicts a typical computing environment in which virtual mass storage subsystem are utilized to store information.

FIG. 1 depicts a typical apparatus in which the methods of the present invention are applied. Compressed virtual storage controller 100 controls the storage and retrieval of information on physical disk storage 108 via bus 152. Compressed virtual storage controller 100 receives requests to store or retrieve information from host computer systems A 104 or B 106 over connection 150. Connection 150 may be any common interconnection medium including a SCSI peripheral bus or a Local Area Network (LAN) connection. Any number of host computer systems, exemplified by host computer systems A 104 and B 106, may be attached to compressed virtual storage controller 100 as appropriate to the protocols and standards of connection 150.

Physical disk storage 108 comprises a plurality of physical storage blocks (typically referred to as sectors, tracks, or cylinders) each of which is addressed by a physical block number. Those of ordinary skill in the art will recognize that the physical block number may represent a simple block number or a composite value indicating a particular head, cylinder and sector depending on the interface specifications for bus 152 and physical disk storage 108.

Compressed virtual storage controller 100 receives requests to store or retrieve information from hosts computer system A 104 over connection 150. Each request from a host computer system is associated with a particular virtual block number identifying the virtual location at which the data is to be stored for later retrieval. Compressed virtual storage controller 100 applies the methods of the present invention (discussed below) to map the host supplied virtual block number into one or more physical block numbers in physical disk storage 108. In the case of a write request, a request to store host supplied data in the requested virtual block number, compressed virtual storage controller 100 also compresses the data to be stored and stores the host supplied data in the mapped physical block numbers of physical disk storage 108. In the case of a read request, a request to retrieve previously stored data from a requested virtual block number, compressed virtual storage controller 100 retrieves the compressed data previously stored, uncompresses the compressed data and returns the uncompressed data to the requesting host computer.

Virtual storage controller 102 exhibits a variation of compressed virtual storage controller 100 wherein data need not be compressed and the physical storage comprises a disk array 110. Disk array 110 further comprises a plurality of physical disk storage devices 112, 114, and 116. The plurality of physical disk storage devices 112, 114, and 116 are controlled by virtual storage controller 102 via signals applied to bus 154. The individual physical disk storage devices 112, 114, and 116 are managed by virtual storage controller 102 to provide enhanced data integrity through data redundancy and error code generation and checking. To host computer systems A 104 and B 106, virtual storage controller 102 presents disk array 110 as a large capacity, highly reliable single physical storage device having a plurality of physical storage blocks each addressable by a corresponding physical block number.

Virtual storage controller 102 receives requests to store or retrieve information from hosts computer system A 104 over connection 150. Each request is associated with a particular virtual block number identifying the virtual location at which the data is to be stored for later retrieval. Virtual storage controller 102 applies the methods of the present invention (discussed below) to map the host supplied virtual block number into one or more physical block numbers in disk array 110. In the case of a write request, a request to store host supplied data in the requested virtual block number, virtual storage controller 102 stores the host supplied data in the mapped physical block numbers of disk array 110. In the case of a read request, a request to retrieve previously stored data from a requested virtual block number, virtual storage controller 102 retrieves the data previously stored and returns the uncompressed data to the requesting host computer.

One of ordinary skill in the art will recognize that the mapping methods of the present invention may be applied to the apparatus as shown in FIG. 1 with or without data compression. In addition, the methods of the present invention may be applied to a wide variety of physical storage devices including individual disk drives, block oriented semiconductor memory mass storage devices (often referred to as RAM disks), redundant arrays of such storage devices (often referred to as RAID subsystems), and various combinations of the above devices. More specifically, the methods of the present invention are applicable to any virtual mass storage subsystem configuration wherein there is a mapping performed between a virtual address domain (virtual block numbers) and a physical address domain (physical block numbers). For example, if the physical storage device compresses data, then there is a mapping of virtual blocks of a particular total storage capacity to physical storage blocks of a lesser and variable total storage capacity. Similarly, if the physical storage is an array of physical storage devices, or a plurality of such arrays, or even a heterogeneous array comprising various storage devices and arrays, then there is a mapping of the host supplied virtual address domain into physical addresses which may include identification of a device and the physical address within that device.

Virtual/physical blocks and clustering

In non-virtual mass storage subsystems there is a one-to-one relationship between a virtual block and a corresponding physical block. In other words the mapping function is a trivial one and the host computer systems essentially directly access the physical blocks of the physical storage devices by reference to a physical address (physical block number). It is common for computer systems to access the physical storage blocks in larger clusters so as to amortize the overhead portions of the disk access over a larger number of data bytes. The computer system simply anticipates that a subsequent storage access may require additional data from contiguous or nearby blocks. To achieve this, computer systems using prior non-virtual mass storage subsystems typically access the mass storage subsystem in units called "clusters" which comprise a plurality of physical blocks.

In a virtual mass storage subsystem, because of the application of redundancy and/or data compression techniques, there is not necessarily a one-to-one relationship between virtual and physical storage blocks. Redundancy and error checking information used in redundant array techniques (i.e. RAID) may expand the storage required to store each virtual block in physical storage. Data compression techniques could reduce the storage capacity required to store each virtual block in physical storage. For these reasons, virtual mass storage subsystems perform a mapping of virtual block numbers into one or more physical block numbers. As with non-virtual mass storage subsystems, host computer programs may access the mass storage in larger units than a single virtual block. A "virtual cluster" is an aggregation of multiple virtual blocks which the host computer uses to access the mass storage to amortize the overhead associated with mass storage access over a larger number of virtual storage blocks. Since the virtual block need not correspond one-to-one with a single physical block, the distinction of a virtual cluster and a virtual block is less significant. The virtual cluster which may contain a number of virtual blocks can be as easily represented by a single virtual block having a larger block size since it need not correspond to any particular physical block size associated with physical storage devices. For example, a virtual cluster comprising 16 virtual blocks each having a fixed size of 512 bytes (totalling 8192 bytes) can be represented as a single virtual block of 8192 bytes. In either case the virtual cluster or virtual block will be mapped to an appropriate number of physical blocks to store the information in the physical storage device(s) of the virtual mass storage subsystem. As used herein, a "virtual cluster" is comprised of one or more "virtual blocks." However, one of ordinary skill in the art will recognize that if a "virtual cluster" contains only one "virtual block", then the terms "virtual cluster" and "virtual block" may be considered synonymous.

A "physical storage block" (or "physical block") as used herein refers to a fixed sized block of bytes on a physical storage device. This physical block size is a parameter of the physical storage device established by the device and the interface standards used to store and retrieve information in the physical device. A "physical cluster" as used herein refers to one or more physical blocks which are mapped by the virtual storage controller to store the data for a virtual block. As discussed herein, the physical blocks of the physical cluster may contain compressed or uncompressed data.

Figure 2:
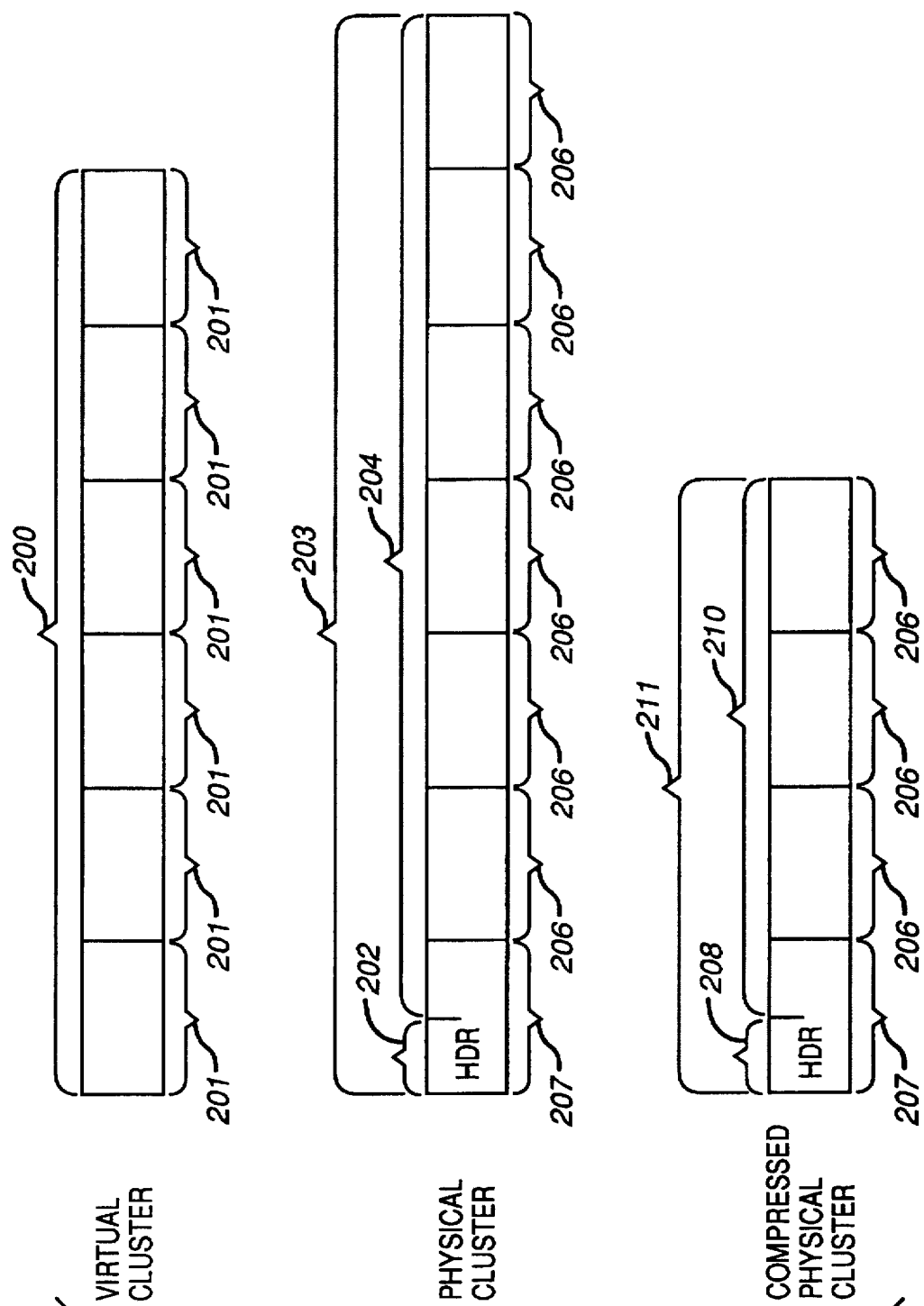
FIG. 2 depicts the relationship between virtual blocks and clusters, and physical blocks and clusters.

FIG. 2 depicts the various block and cluster elements of data described above. Virtual cluster 200 is the unit of information manipulated by the host computer system and comprises one or more virtual blocks 201. Host computer systems request that a particular virtual cluster 200 identified by a corresponding set of virtual block numbers be manipulated (either stored or retrieved) by the virtual storage controller. The identified virtual blocks are stored in physical storage devices in a physical cluster 203 comprising one or more physical blocks 206 and 207. A virtual storage controller receives the request and maps the requested virtual block numbers to a physical cluster 203 comprising a first physical block 207 and zero or more additional physical blocks 206. The first physical block 207 associated with virtual block 200 contains a header portion hdr 202. Hdr 202 comprises information which identifies the additional physical blocks 206 which are associated with the virtual cluster 200 provided by the host computer system. The first physical block 207 stores header hdr 202 in a first portion of its storage capacity and stores the beginning of the virtual cluster 200 data 204 in the remainder of its storage capacity. The additional physical blocks 206 associated with the virtual cluster 200 contain the remainder of the data 204 of virtual cluster 200.

Methods of the present invention (discussed below) map the virtual block numbers provided by the host computer system into the first physical block number 206. Mapping information is retrieved from hdr 202 by reading the physical cluster 203 which contains the first physical block 207 which contains mapping information to locate the additional physical blocks 206. The same access to physical storage which retrieves the mapping information in the hdr 202 of the first physical block 207 retrieves an initial portion of the data 204 stored in the first physical block 207 as well as data in additional physical blocks 206 of the same physical cluster 203. This simultaneous retrieval of the mapping information for the additional physical blocks 206 and the data stored in the same physical cluster 203 reduces the overhead associated with prior approaches which stored the mapping information in reserved areas of the physical storage devices. In addition, since it is common for the entire virtual cluster to be stored within the physical blocks of a single physical cluster, the entire virtual cluster is thereby retrieved with a single access to the physical storage modules for multiple physical blocks 206–207 of a physical cluster 203. The methods of the present invention therefore reduce the need for large semiconductor memories to store the mapping information. A compromise is achieved in the methods of the present invention which provide superior performance over prior approaches which stored the mapping information in reserved areas of the physical storage yet requires far less semiconductor memory to achieve the improved performance.

As noted above, the methods of the present invention are also applicable with data compression techniques to reduce the volume of physical storage required for each virtual cluster 200. A compressed physical cluster 211 is also shown in FIG. 2 which may store the data of virtual cluster 200 in a compressed form. In response to a write request from a host computer system (a request to store a virtual block in the virtual mass storage subsystem), the controller receives the data for the virtual cluster 200, compresses it according to any of several well known compression technique, then stores the compressed data in a compressed physical cluster 211 comprising a first physical block 207 and zero or more additional physical blocks 206. A virtual storage controller receives the request and maps the requested virtual block numbers to a compressed physical cluster 211 comprising a first physical block 207 and zero or more additional physical blocks 206. The first physical block 207 associated with virtual cluster 200 contains a header portion hdr 208. Hdr 208 comprises information which identifies the additional physical blocks 206 which are associated with the virtual cluster 200 provided by the host computer system. The first physical block 207 stores header hdr 208 in a first portion of its storage capacity and stores the beginning of the virtual cluster 200 data 210 in the remainder of its storage capacity. The additional physical blocks 206 associated with the virtual cluster 200 contain the remainder of the data 210 of virtual cluster 200.

Hdr 208 identifies which data compression technique is used to compress the data of the virtual cluster 200 into the physical cluster 211. Hdr 208 also contains the compressed data length as may be required for uncompression of the compressed data under various data compression techniques.

Methods of the present invention as outlined above improve upon prior approaches by providing increased performance in accessing the physical cluster while reducing the requirement for costly semiconductor memory device to store the mapping information. Use of data compression techniques in conjunction with the methods of the present invention provides the added benefit of improved storage capacity on the virtual mass storage subsystem.

Figure 3:
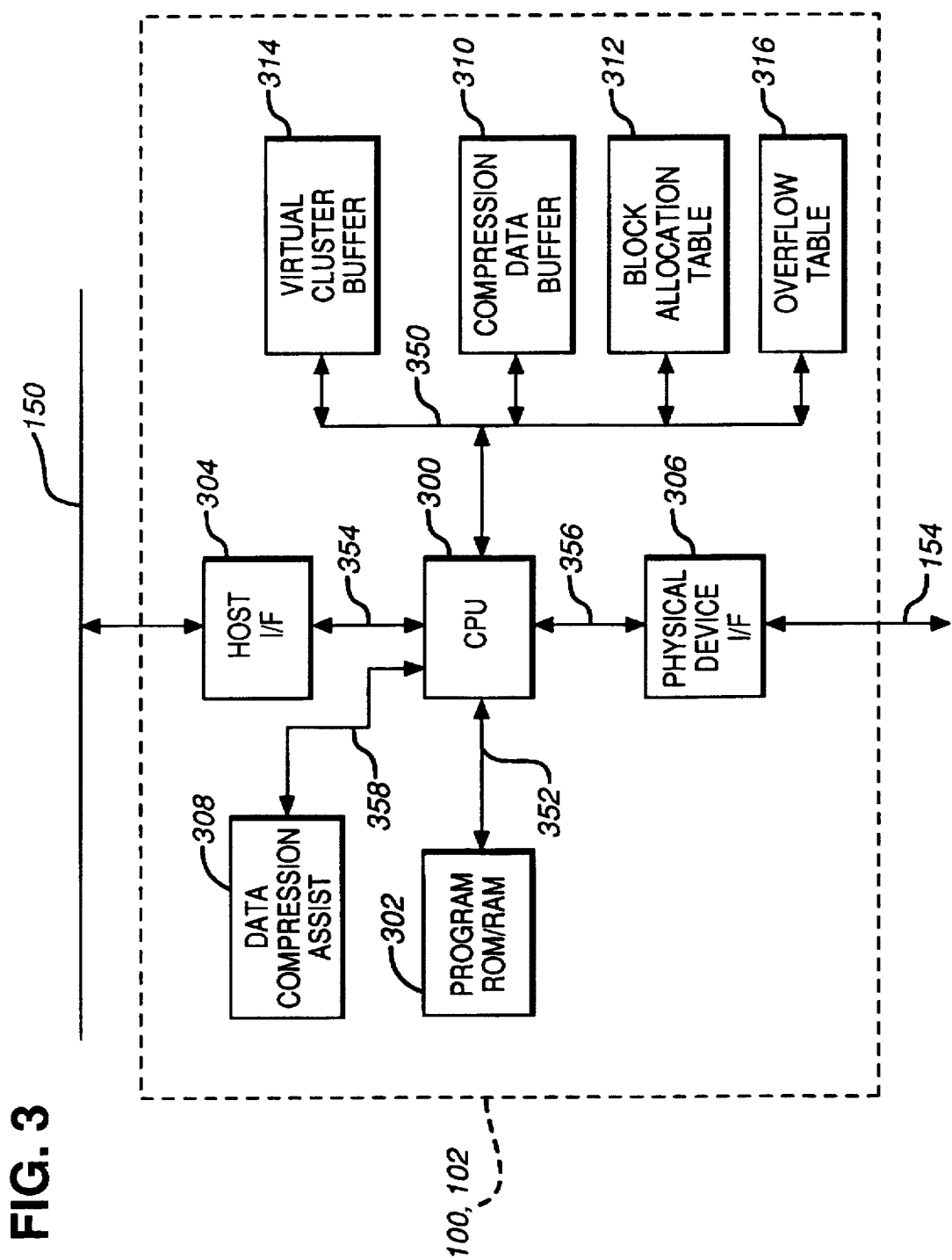
FIG. 3 is a block diagram of a virtual storage controller apparatus which operates according to the methods of the present invention.

FIG. 3 depicts a compressed virtual storage controller 100 which operates according to the methods of the present invention (as well as a virtual storage controller 102 which operates identically but for the use of data compression techniques). CPU 300 exchanges information with host interface 304 over bus 354. Host interface 304 adapts controller 100 to the standards and protocols applied by host computer systems to connection 150. Connection 150 is any of several standard interface connections for mass storage subsystems including SCSI, local area networks (LANs), IDE, IPI, and others. In other words, CPU 300 exchanges information with host computer systems via connection 150, host interface 304, and bus 354. CPU 300 fetches and executes its program instructions stored in program ROM/RAM 302 over bus 352. Further, CPU exchanges information with physical storage devices via bus 154. Physical device interface 306 adapts the protocols and signals applied to bus 154 and bus 356 to exchange the required information between CPU 300 and the physical storage devices.

CPU 300 utilizes memory buffers 310–316 in performing the methods of the present invention. CPU 300 stores and retrieves information in memory buffers 310–316 over bus 350. Virtual cluster buffer 314 is used by CPU 300 to store the data contents of a virtual cluster to be manipulated in response to a host computer system request. In response to a host computer system request to read a particular virtual cluster identified by a set of virtual block numbers, CPU 300 retrieves the data from physical storage devices and holds the data in virtual cluster buffer 314 for transfer to the requesting host computer system over bus 354, host interface 304, and connection 150. In response to a host computer system request to write a particular virtual block identified by a virtual block number, CPU 300 receives the data to be written from the requesting host computer system and stores the data in virtual cluster buffer 314 in preparation to write the data to the physical storage devices.

Compression data buffer 310 is used by CPU 300 in conjunction with data compression assist 308 to perform compression and uncompression of the data stored in the physical storage devices of the mass storage subsystems. As discussed above, the methods of the present invention may be applied to virtual mass storage subsystems with or without data compression embedded within the operation of the controller. When data compression is utilized within controller 100, virtual cluster data received from a host computer system requesting a write of the virtual cluster is stored in virtual cluster buffer 314 (as discussed above), then compressed by CPU 300, temporarily storing the compressed data in compression data buffer 310. The compressed data temporarily stored in compression data buffer 310 is then written to physical storage devices according to the methods of the present invention (discussed further below). Conversely, a host computer system request to read a particular virtual cluster causes CPU 300 to retrieve compressed data previously stored on physical storage devices into compression data buffer 310. The compressed data is then uncompressed by CPU 300 and stored into virtual cluster buffer 314 and returned to the requesting host computer system over bus 354, host interface 304, and connection 150.

Many data compression techniques may be utilized in conjunction with the virtual to physical mapping methods of the present invention. Several data compression techniques may be performed directly by the processing features of CPU 300 operating under appropriate programmed instructions. Other data compression techniques may require the assistance of custom circuitry adapted to more effectively perform the required data compression and uncompression. For such compression techniques, CPU 300 exchanges information with data compression assist 308 over bus 358. CPU 300 applies uncompressed data and control commands to data compression assist 308 and receives the corresponding compressed data. Conversely, CPU 300 may apply compressed data and appropriate control commands to data compression assist 308 over bus 358 and receive the corresponding uncompressed data.

Block allocation table 312 (also referred to herein as BAT) and overflow table 316 are memory buffers used by CPU 300 in performing the methods of the present invention to manage the allocation and freeing of physical storage blocks on the physical storage devices in the mass storage subsystem. BAT 312 is a bitmap memory buffer in which one bit corresponding to each physical storage block in the mass storage subsystem indicates whether the corresponding physical storage block is available for new data to be stored or already allocated to storage of another virtual block. Use of BAT 312 is discussed in further detail below. Overflow table 316 is a memory buffer in which one bit corresponding to each physical cluster indicates whether the physical cluster has overflowed to allocate physical blocks from other physical clusters. Overflow table 316 is discussed in further detail below.

Mapping methods—overview

In a virtual mass storage subsystem there is a mapping of a virtual block (or virtual cluster) to one or more physical storage blocks on the physical storage devices of the subsystem. This mapping is performed by the virtual storage controller so as to hide the host computer system from the details of the mapping requirements. Host computer systems view the virtual mass storage subsystem as most other mass storage devices, namely an array of virtual storage blocks each addressed by a virtual block number. Host computer systems typically access the virtual blocks in groups referred to as a virtual cluster.

The physical storage blocks of the physical storage devices are also identified by a physical block number such as a simple integer block number. In the alternative physical block number may be a numeric tuple which identifies particular values of parameters of the device in order to identify a particular storage block. For example, in a standard rotating media disk drive, a block number may be a tuple identifying a particular head on the storage unit, a particular concentric track or cylinder, and a particular sector within a track. In an array storage device, the block number may include an identifier of the particular storage device unit number within the plurality of storage devices in the array. As used herein, the term "physical block number" is intended to represent any such value, address, or numeric tuple which uniquely identifies a particular physical storage block.

A virtual cluster comprising a set of virtual blocks is mapped to a corresponding set of physical storage blocks referred to herein as a physical cluster. The aggregate storage capacity of the set of physical storage blocks (the size of the physical cluster) associated with a virtual cluster must be sufficient to store the information of the virtual cluster. If data compression methods are used to compress the physical storage, then the physical cluster size may be less than the size of the corresponding virtual cluster. If redundant disk array (RAID) techniques are used in the physical storage devices, then the size of the physical cluster may be greater than the size of the corresponding virtual cluster to account for the storage of redundancy and error check information in addition to the data. In either case a typical relationship can be approximated between the size of a virtual cluster and the size of the physical cluster. For example, applying RAID Level 0 (disk striping) techniques, there is no expansion of the physical storage capacity to store a virtual cluster. The size of a virtual cluster is equal to the size of a corresponding physical cluster. RAID Level 1 (mirroring) techniques require an exact duplicate of each physical storage block to enhance integrity thereby doubling the physical storage capacity required to store each virtual cluster. RAID Levels 3, 4, and 5 techniques add extra disk drives to the disk array for holding error check and redundancy information thereby increasing the storage capacity required to store each virtual cluster. In other words the virtual storage capacity is less than the physical storage capacity when RAID Level 3–5 techniques are applied. Conversely, when data compression techniques are used to compress the information stored on physical storage devices, the virtual cluster requires less physical storage capacity. In other words, the physical storage capacity is increased relative to the virtual storage capacity when data compression techniques are applied. Typical compression techniques reduce the volume of data by a factor between 1 and 2. When data compression techniques are combined with RAID techniques, the effects of redundancy which reduce the physical storage capacity may be minimized so that a net increase in virtual storage capacity may be achieved.

As used herein the term "net compression ratio" refers to the typical effective compression ratio achieved when all factors affecting the physical storage capacity required to store a virtual cluster are summed (i.e. the effects of data compression if applied and the effects of redundancy and error checking techniques common to RAID if applied). Compression ratio as used herein is the typical ratio of a virtual cluster size divided by the corresponding compressed physical cluster size. One of ordinary skill in the art will recognize that a compression ratio as used herein is not a fixed value, but rather varies according to the data compression methods applied and the nature of the data being compressed.

A physical cluster is a set of physical storage blocks. The size of a physical cluster (as determined by the number of physical storage blocks contained therein) is optimally chosen to be the approximate size of the virtual cluster divided by the net compression ratio. It is preferred that the size be somewhat larger than normally required by conservatively estimating the net compression ratio when the virtual mass storage subsystem is configured. Such a conservative estimate helps to reduce the possibility that the physical storage capacity is exhausted before the host computer systems believe that the virtual storage capacity is exhausted. Such an exhaustion can occur if the virtual clusters do not compress sufficiently due to the nature of the host supplied data and the compression techniques employed. When such an exhaustion occurs, a variety of well known error recovery and reporting techniques may be employed. For example, the virtual mass storage subsystem may simply report an error status to the host computer system and await corrective actions initiated by the host systems. Alternatively, the virtual mass storage subsystem may wait for a period of time and retry the operation in hopes that an intervening operation has freed previously allocated physical blocks.

In the methods of the present invention, the physical storage devices are logically partitioned into physical clusters each comprising a fixed number of physical storage blocks. Each physical cluster is identified with a corresponding virtual cluster. Both the physical cluster and the corresponding virtual cluster may be identified by a single cluster number. The first physical block number of each physical cluster is easily calculated as:

cluster_number=floor(virtual_block_number/virtual$_{13}$ blocks_per_cluster)

physical_block_number=cluster_number x physical_blocks_per_cluster where floor(x) is the integer value less than or equal to x. The additional physical blocks in each physical cluster are preferably the next physical blocks in sequence by physical block number up to the next physical block at the start of the next physical cluster. For example, if the virtual cluster size is 8 virtual blocks and the net compression ratio is 1.5 then the physical cluster size is 6 physical blocks (assuming virtual and physical block sizes are equal). A mapping for this example is shown in the following Table 1:

TABLE 1

Sample virtual to physical mapping

| Cluster number | Virtual Address Space<br>Virtual Block Number | Physical Address Space<br>Physical Block Number |
|---|---|---|
| 0 | 0  1  2  3  4  5  6  7 | 0  1  2  3  4  5 |
| 1 | 8  9  10 11 12 13 14 15 | 6  7  8  9  10 11 |
| 2 | 16 17 18 19 20 21 22 23 | 12 13 14 15 16 17 |
| 3 | 24 25 26 27 28 29 30 31 | 18 19 20 21 22 23 |
| ... | | |

Figure 4:
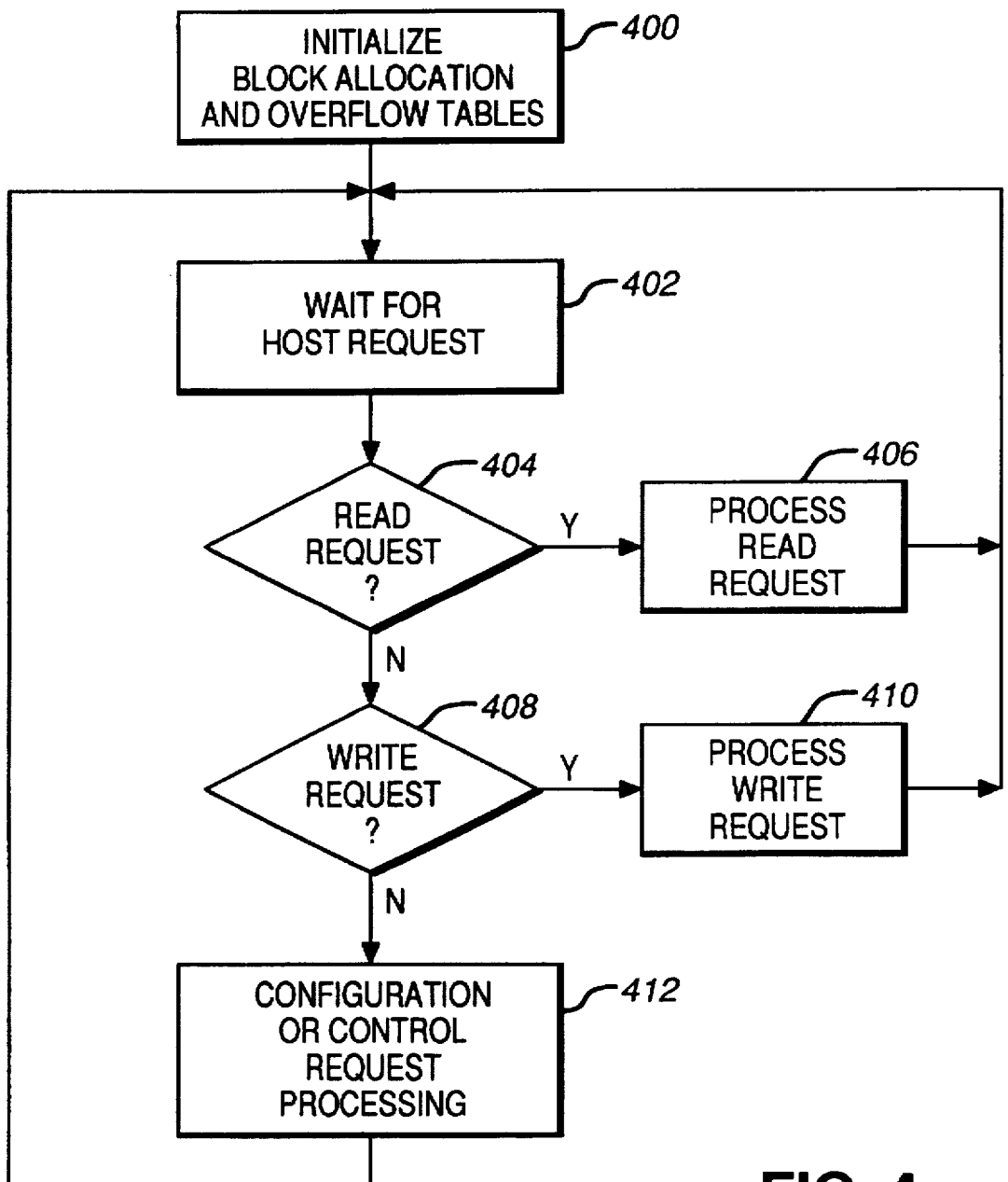
FIG. 4 is a flowchart depicting the high level operation of the virtual storage controller of FIG. 3 operating according to the methods of the present invention.

FIG. 4 is a flowchart of the overall operation of virtual storage controller 102 of FIG. 3. Element 400 is operable to initialize the block allocation table 312 and the overflow table 316. The block allocation table 312 is used to determine which physical storage blocks are free for use and which are already in use to store the contents of a virtual cluster (compressed or not compressed). The overflow table 316 is used to quickly determine which physical clusters have overflowed (used more physical blocks to store a virtual cluster than nominally allocated to a physical cluster). Use of these table structures is discussed in additional detail below. Element 402 awaits a request from a host computer system to read or write a particular virtual cluster in the virtual mass storage subsystem.

Elements 404 and 406 are operable to determine that the received request is for a read operation on a previously stored virtual cluster and to process the read request. Similarly, elements 408 and 410 are operable to determine that the received request is for a write operation to store a virtual cluster in the virtual mass storage subsystem (or analogously to overwrite a previously stored virtual cluster). Element 412 is operable to process other types of control and configuration operations beyond the scope of the present invention.

Mapping methods—block allocation and overflow tables

As noted above, the first physical block number (the home block) in any physical cluster is determined by a simple calculation based on the virtual block numbers provided by the host computer system's request. If no compression techniques are applied, the physical cluster size will be fixed and the additional physical blocks used to store the virtual cluster in the physical cluster may be predetermined as the next physical block numbers in sequence up to the start of the next physical cluster. However, when data compression techniques are applied to the virtual cluster, the number of physical blocks required to store the virtual cluster is not fixed but rather varies depending upon the actual compression achieved. In this latter case it is preferred that the physical storage blocks (other than the first physical block) be dynamically allocated after the compressed data size of the virtual cluster is known. The storage of a particular compressed virtual cluster may require more or less than the nominal number of physical blocks in a physical cluster (as determined by the net compression ratio).

Figure 9:
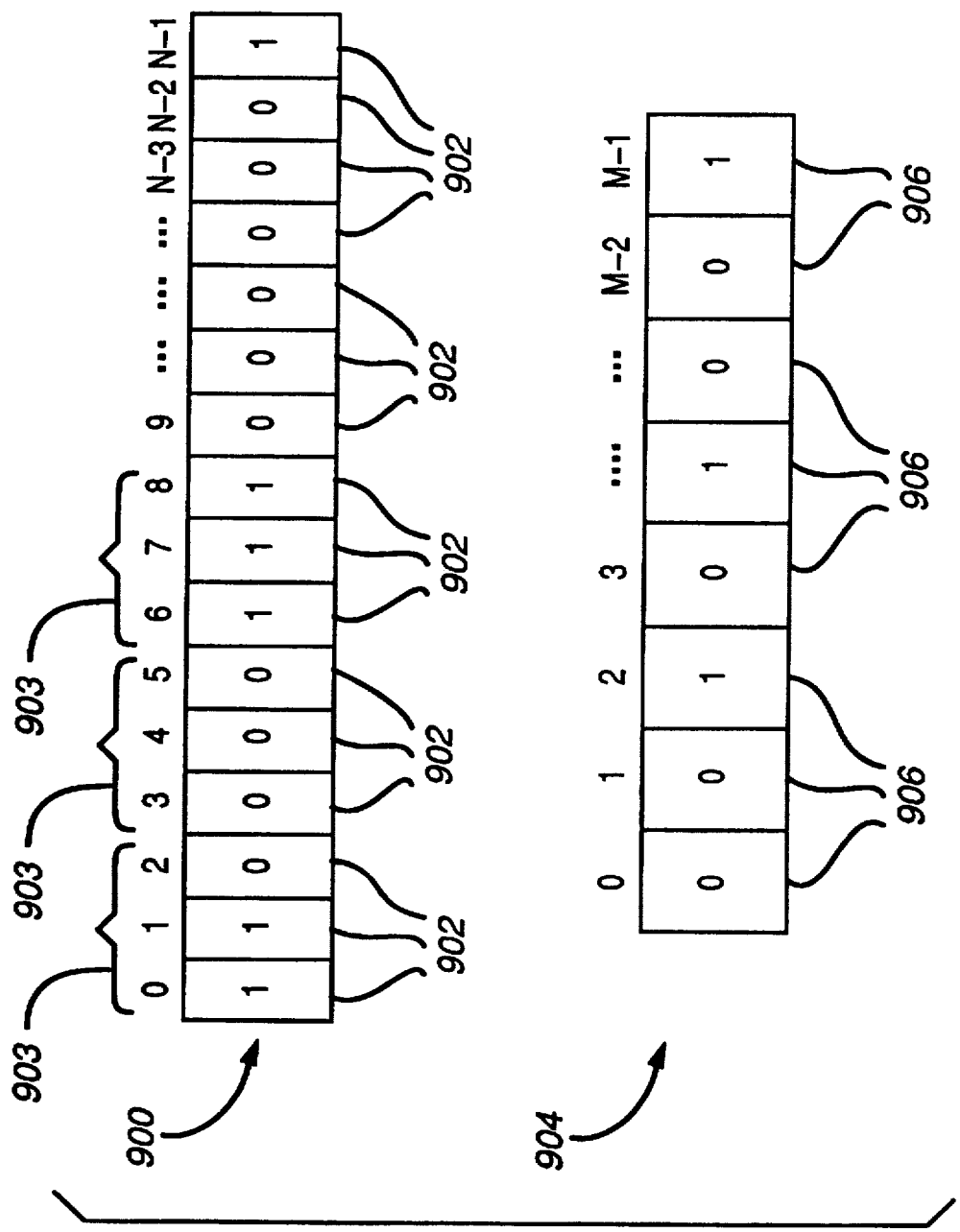
FIG. 9 depicts exemplary implementations of the block allocation table and the overflow tables.

In the preferred embodiment of the methods of the present invention there are a fixed, equal number of physical blocks in each physical cluster, and a block allocation method is used which dynamically allocates additional physical blocks to the storage of a particular virtual cluster when the virtual cluster is actually stored on the physical storage. A block allocation table (312 in FIG. 3.) is maintained in which an array of memory bits is indexed by physical block number and indicates whether the corresponding physical block number is available for use or already in use to store another virtual cluster. Block allocation table 312 is shown in additional detail in FIG. 9. Block allocation table 900 comprises an array of bits 902, each bit corresponding to a particular physical block identified by the physical block numbers 0,1,2 . . . N. A bit is set to indicate that the corresponding physical block is no longer free when the physical block is allocated to store a portion of a virtual cluster. Bits 902 of the block allocation table 900 are logically grouped into associated physical clusters shown as 903 in FIG. 9. As shown in FIG. 9, block allocation table 900 indicates that physical block numbers 0, 1, 6-8, N−1 and are allocated to the storage of some virtual cluster data. When a block is required to be allocated for storage, a search method is used to locate a preferred physical block which is currently free (i.e. corresponding bit in the block allocation table 312 is not set).

The single bit block allocation table 900 requires a minimum amount of memory to record the current status of a particular corresponding physical block. One of ordinary skill in the art will recognize that other data structures may be utilized to record the status of each physical block which may be optimal under other assumptions and circumstances. For example, a list structure or hash tables may be utilized to locate available physical blocks. Such structures may enhance the performance of particular search techniques used to locate an available physical block, but may require substantially more memory when the list/table of available physical blocks is lengthy. In addition, one of ordinary skill will recognize that if the allocation table entry is wider than a single bit, it may be used to store the cluster number to which a particular physical block is allocated.

Mapping methods—overflow table

Reading and writing of physical blocks and clusters (including allocation and deallocation) requires knowledge of the list of blocks allocated to the storage of a cluster. Knowledge of the blocks allocated to the storage of a cluster may require reading the first physical block of the virtual cluster to obtain the mapping information. This read may be avoided, thereby improving subsystem performance, if it is known in advance that no physical blocks in the physical cluster have been allocated as overflow blocks for storage of another virtual cluster and if it is known that the storage in this physical cluster did not require the allocation of overflow block from other clusters. In such a case, it is known that the physical cluster contains data stored for all of one, and only one, virtual cluster. The read of the physical cluster is therefore known to complete the read of the virtual cluster. Similarly, in write operation, the physical blocks of the physical cluster may be deallocated in a simple operation without requiring inspection of the mapping information in the home block.

The methods of the present invention include the creation and maintenance of an overflow table (316 of FIG. 3) to indicate that the corresponding physical cluster does not overflow to another cluster and that no physical blocks of the corresponding physical cluster have been allocated as overflow blocks for storage of another physical cluster. The overflow table 316 comprises a bit array with one bit corresponding to each physical cluster of the virtual mass storage subsystem. Overflow table 316 is shown in additional detail in FIG. 9. Overflow table 904 comprises an array of bits 906, each corresponding to an associated physical cluster number 0, 1, 2, ... M−1. A bit is reset in the overflow table 904 if the physical blocks of the corresponding physical cluster does not have an overflow condition as described above. A bit 906 in the overflow table 904 is set to indicate that an overflow condition has occurred in the corresponding physical cluster. In such a case, reading and writing (including allocation and deallocation of physical blocks) may need to inspect the block list of the header data structure and the block allocation table to determine which physical blocks in a cluster are allocated to that cluster or allocated to another physical cluster as overflow blocks.

When such an overflow condition is present in a particular physical cluster, the first physical block must be read to obtain the mapping information stored in the header data structure. When the overflow bit is reset for a corresponding physical cluster, the first block need not be read merely for purposes of obtaining the mapping information. Avoiding unnecessary reads of the first physical block enhances the performance of the virtual mass storage subsystem.

Mapping methods—first block header

The first physical block (the home block) used in a physical cluster to store a virtual cluster is located by a direct calculation as a function of the cluster number as discussed above. Additional physical blocks allocated to store the contents of the virtual cluster are located using mapping information stored in a header data structure (hdr 202 and 208 of FIG. 2) prepended to the start of the first physical block of the cluster. The header data structure contains a list of physical block numbers for additional physical blocks allocated to store the virtual cluster corresponding to the physical cluster which contains the first physical block. The list provides the physical block numbers in the order of their allocation to the storage of the corresponding virtual cluster.

The header data structure stored in the first physical block of a physical cluster also contains information used to uncompress the data if it was previously stored with data compression. A field of the header data structure indicates which (if any) data compression technique was utilized to compress the virtual cluster stored in the physical cluster. Another field of the header data structure records the data length of the virtual cluster. Depending upon the compression technique applied to the storage of the virtual cluster, the compressed length of the stored data may be required to uncompress the data. If the data is stored without compression the compression type field indicates no compression and the data length field is ignored (the full virtual cluster is stored uncompressed in the physical cluster).

The following C language data structure is exemplary of a header data structure useful in the methods of the present invention:

```
struct cluster_header {
    alg_type  hdr_algorithm;   /* compression algorithm used */
    int       hdr_datalen;     /* compressed data length of cluster */
    adr_type. hdr_blocklist[MAX_BLOCKS];
                               /* array of additional physical blocks */
}hdr;
```

As noted above, access to the first physical block retrieves the header data structure as well as a portion of the virtual cluster data in the remainder of the first physical block. In fact, the entire physical cluster is accessed in anticipation of utilization of the additional blocks in the physical cluster containing the home block. This feature resolves the problems of prior approaches which stored all mapping information in reserved areas of the physical storage devices. In such prior approaches, a first access to the physical storage is required to obtain the mapping information followed by one or more additional accesses to obtain the stored data. In the present invention a single access to the first physical block (located by means of a simple calculation as described above) retrieves both the remaining mapping information as well as a first portion of the stored virtual cluster data. This first access also reads the additional physical blocks which are contained in the same physical cluster as the first physical block (the home block). It is common that the additional physical blocks used to store a virtual cluster are allocated in the same physical cluster as the home block which contains the mapping information. Reading the entire physical cluster thereby improves the overall performance of the virtual mass storage subsystem by using a single, multiple block, access to the physical storage modules to retrieve the mapping information and typically the entire contents of the requested virtual block. In addition, the present invention solves the problem of other prior approaches which required large capacity semiconductor memories to store the mapping information. Rather, the present invention directly computes the required mapping information for the first physical block and stores the remaining mapping information for any additional physical block in that first physical block.

Mapping methods—read request

Figure 5A:
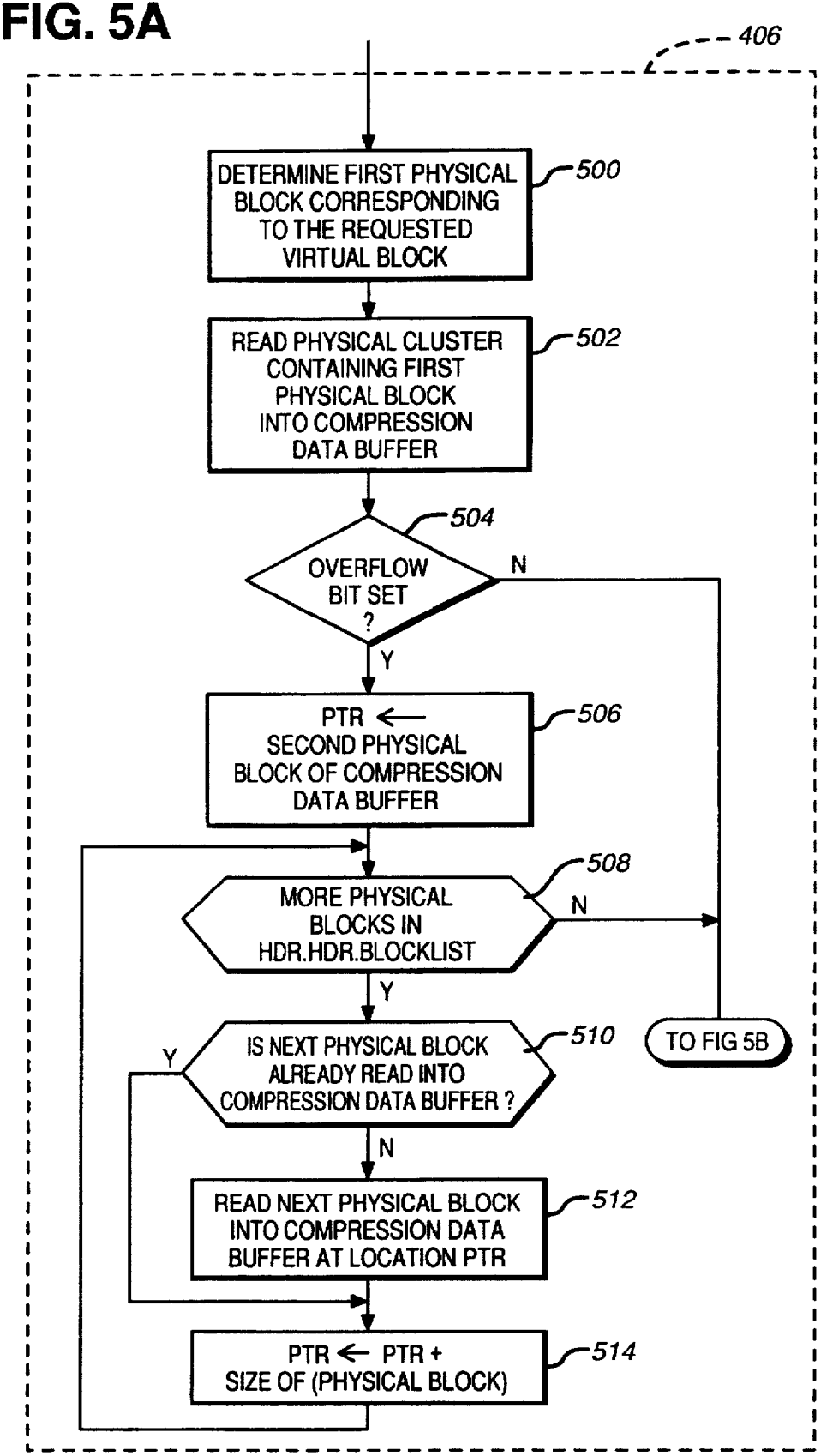
FIGS. 5A and 5B are a flowchart which depicts additional detail of the read operation of the methods of the present invention depicted in FIG. 4.
Figure 5B:
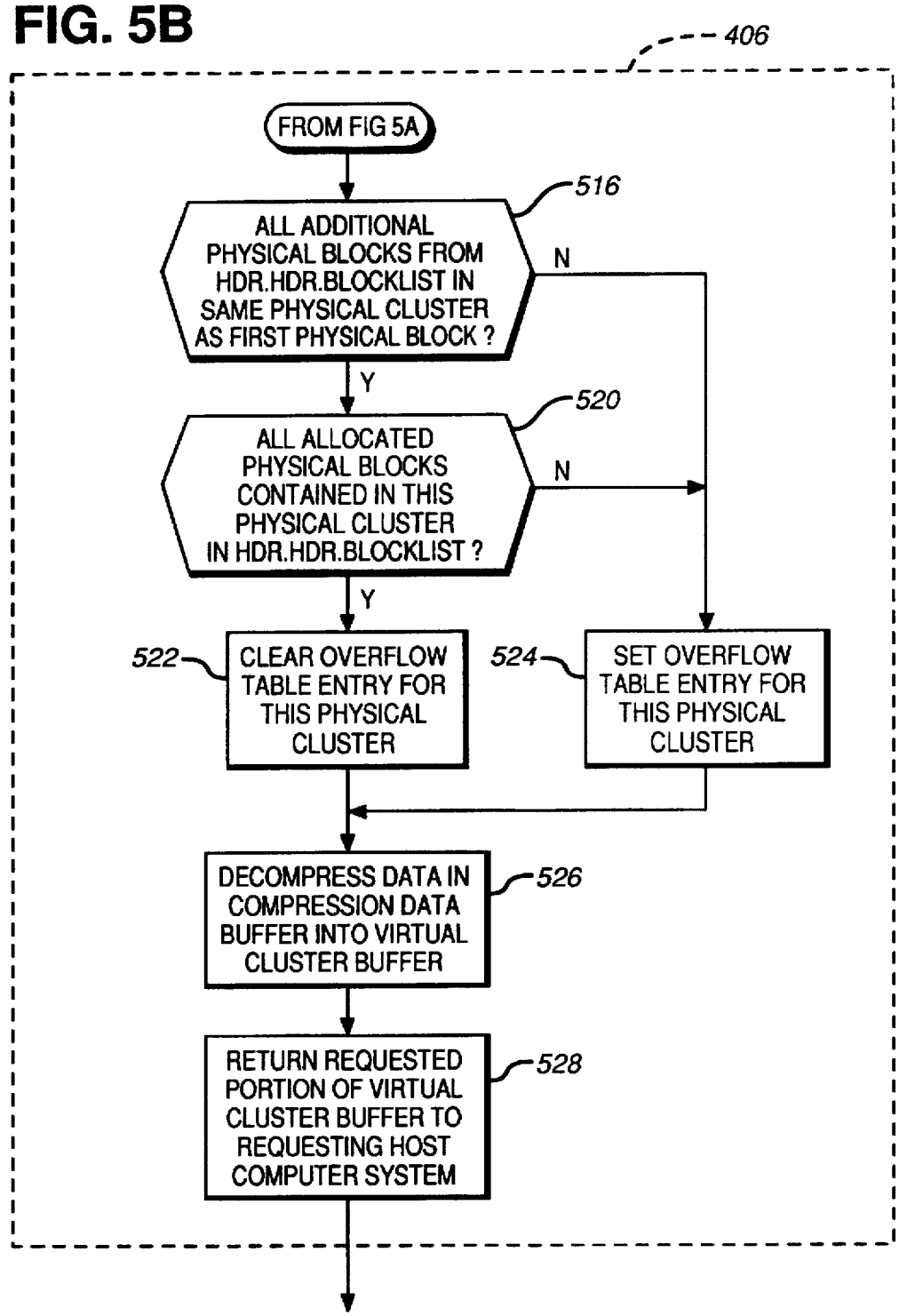

The methods of the present invention process a read request from a host computer system to return data previously stored in the virtual mass storage subsystem (element 406 of FIG. 4). FIGS. 5A and 5B, combined, is a flowchart of the operation of the methods of the present invention to read data from a virtual cluster previously stored in the virtual mass storage subsystem.

Elements 500 and 502 are operable to locate and read the physical cluster corresponding to the virtual cluster or virtual block number requested by the host computer system. Element 500 locates the first physical block by mapping the supplied virtual block number using the direct calculation described above. The calculation determines the physical block number of the first physical block with virtual cluster data corresponding to the host computer systems requested virtual block. Element 502 reads the physical cluster which contains the first physical block determined by operation of element 500. The physical cluster is read into the beginning of the compression data buffer (310 of FIG. 3). The first physical block contains the header data structure described above as well as a portion of the data in the corresponding virtual cluster.

Element 504 is next operable to determine whether the overflow bit 906, in the overflow table 904, corresponding to the physical cluster containing the first physical block is set or reset. If reset, processing continues with element 516 of FIG. 5B. The overflow bit 906 being reset indicates that the physical cluster does not overflow into another physical cluster by allocating additional overflow blocks. In this case, the entire physical cluster, now read into the compression data buffer 310, comprises the entirety of the storage allocated to the requested virtual cluster. There is no need to check the mapping information in the header data structure of the first physical block. It is a common occurrence that the entire virtual cluster is stored in a single, contiguous, physical cluster (compressed to reduce its size). This optimization improves the performance of the virtual mass storage subsystem by eliminating the need for access to the physical storage modules for the sole purpose of locating the physical blocks used to store the virtual cluster. A single, multi-block, access to the physical storage modules the sole access to read the requested virtual cluster.

If element 504 determines that the overflow bit 906 corresponding to the physical cluster is set, then the header data structure in the first physical block must be inspected to determine the physical blocks allocated to the storage of the corresponding cluster. The overflow bit may indicate that the storage of the corresponding cluster has overflowed into other physical blocks of other physical clusters (overflow blocks). Processing continues with element 506.

Element 506 is operable to initialize a processing loop which reads any additional physical storage blocks into the compression data buffer 310. The additional physical storage blocks (if any) are read into the compression data buffer 310 following the first physical block. The first physical block was already read into the beginning of the compression data buffer 310 by operation of element 502 above. A pointer variable PTR is set by operation of element 506 to point to the location in the compression data buffer 310 immediately following the storage of the first physical block. Elements 508-514 then operate iteratively to read any additional physical blocks into the compression data buffer 310 starting at the position pointed to by the PTR variable.

Each additional physical block in the hdr_blocklist of the header data structure is processed by an iteration of the looping elements 508-514. Element 508 is operable to determine whether any additional physical blocks in the hdr_blocklist are yet to be processed. If no further blocks remain to be processed, then the entire virtual cluster has been read and processing continues with element 516 in FIG. 5B. Element 510 is next operable to determine whether the additional physical block in the hdr_blocklist currently being processed was already read into its proper position in the compression data buffer 310 by operation of element 502. Though there may be overflow blocks allocated to store the corresponding virtual cluster, the physical cluster contiguous physical blocks read by operation of element 502 may already be read into their proper position in the compression data buffer 310. If the additional physical block currently being processed was already read into the proper position, then processing continues with element 514. Otherwise, element 512 is operational to read the additional physical block currently being processed into the next position of the compression data buffer 310 as pointed to by the variable PTR. Element 514 is operable to increment the PTR pointer variable to point at the location for the next physical block to be read into the compression data buffer 310. Processing then continues by looping back to element 508 until no further additional physical blocks remain to be read into the compression data buffer 310.

When reading a physical cluster, the overflow table 904 entry corresponding to the requested physical cluster is updated to reflect the current status of overflow block allocation related to the physical cluster. Similar processing in the write operations described below maintains the correct state of the overflow table 904 through continued operation of the virtual mass storage subsystem. Element 516 of FIG. 5B is operable to determine whether all additional physical blocks used to store the virtual cluster are contained within the same physical cluster as the first physical block (the home block). This is determined by inspecting the additional blocks listed in the hdr_blocklist of the header data structure of the physical cluster's home block. If all physical blocks in the hdr_blocklist are contained within the same physical cluster, then the storage of the virtual cluster did not require allocation of overflow block from another cluster. If such is not the case, (i.e. at least one additional physical block is allocated as an overflow block from another physical cluster), then processing continues with element 524 to set the overflow bit 906 of FIG. 9 corresponding to the physical cluster in the overflow table 904 of FIG. 9. If the additional physical blocks used to store the virtual cluster are all within the same physical cluster as the home block, then processing continues with element 520. Element 520 determines whether all physical blocks currently allocated in the physical cluster containing the home block are in use to store the same virtual cluster. This is determined by inspecting the block allocation table 312 entries corresponding to the physical cluster which contains the home block. If all allocated physical blocks in the physical cluster which contains the home block are in the hdr_blocklist of the home block's header data structure, then all additional physical blocks are in use to store the same virtual cluster and processing continues with element 522. Otherwise, if storage of another physical cluster allocated an overflow block in the physical cluster containing the home block being processed, then processing continues with element 524, as above, to set the overflow bit 906 corresponding to the physical cluster in the overflow table 904 of FIG. 9. Element 522 resets the overflow bit 906 corresponding to the physical cluster in the overflow table 904 of FIG. 9 since no overflow block are allocated in the physical cluster nor are any overflow blocks necessary to store the requested virtual cluster.

One of ordinary skill will recognize that use overflow table 904 as described above serves to enhance the performance of the methods of the present invention. The overflow bit 906 corresponding to the requested cluster is inspected to determine whether the initial read of the physical cluster completes the processing of the read request (with respect to access to physical storage devices). If the bit is set, further processing is performed, possibly including access to the physical storage modules to read additional physical blocks.

When all compressed data of the virtual cluster corresponding to the host computer system's request has been read into the compression data buffer 310 and the overflow table entry has been updated, element 526 is then operable to uncompress the data. The compressed data in the compression data buffer 310 is uncompressed into the virtual cluster buffer 314 of FIG. 3. The hdr_algorithm field of the header data structure is used to determine which (if any) compression algorithm was used to compress the data when written to the physical cluster. If no compression was used for the stored cluster, then the data is simply moved from the compression data buffer 310 to the virtual cluster buffer 314. Element 528 is then operable to return the requested portion of the uncompressed virtual cluster to the requesting host computer system. The host computer system may request a single virtual block, an entire virtual cluster, or any portion thereof, be returned for further processing.

One of ordinary skill in the art will recognize that the read methods described above with reference to FIGS. 5A and 5B may be easily adapted to operate without data compression techniques. If the compression and uncompression operations described above are simply replaced by null operations, and the associated use of the compression data buffer is eliminated (replaced by simple buffer to buffer copy operations where required), then the methods discussed above may be applied to a virtual mass storage subsystem devoid of data compression techniques.

One of ordinary skill will recognize that a slight performance improvement may be achieved by representing the overflow table information as two parallel table structures. A first overflow table as described in FIG. 9 may be used to indicate that a corresponding physical cluster has allocated overflow blocks in other physical clusters to provide storage of the host supplied virtual cluster. A second overflow table may be used to indicate that a corresponding physical cluster has physical blocks contained therein allocated as overflow block by other physical clusters. Separating these two functions of the overflow table into two independent tables allows element 504 of FIG. 5A, described above, to inspect only the first overflow table. Element 504 and the associated paths of operation in FIGS. 5A and 5B need only the knowledge that the physical cluster has overflowed to allocate overflow blocks in other physical clusters. The write operations, discussed below, wherein blocks are deallocated may need to inspect the overflow status bits in both tables. The improvement so realized is likely to be minor at best yet requires a doubling of the size of the overflow table 316.

Mapping methods—write request

Figure 6:
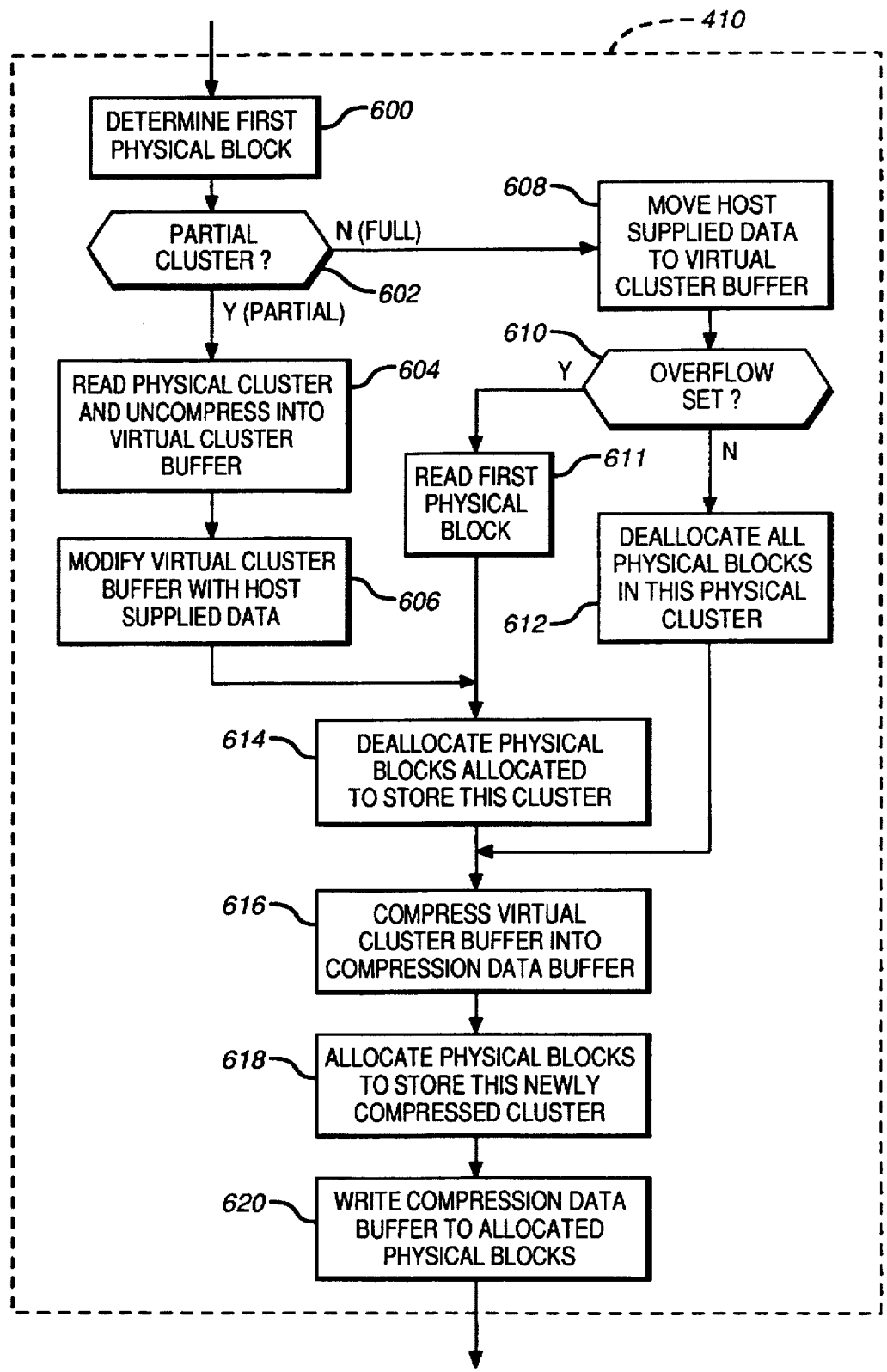
FIG. 6 is a flowchart which depicts additional detail of the write operation of the methods of the present invention depicted in FIG. 4.

Element 410 of FIG. 4 which processes a write request from a host computer system is shown in additional detail in FIG. 6. Element 600 is operable to determine the first physical block which corresponds to the host computer systems requested virtual cluster. Operation of element 600 is identical to the operation of element 500 described above with respect to FIG. 5. Element 602 next determines whether the host computer system write request is for a full virtual cluster or a part of a virtual cluster. If the entire virtual cluster content is to be re-written, then processing continues with element 608 below. If a partial virtual cluster is to be written, with the rest of the blocks of the virtual cluster being left unchanged (such as is typical in the case in a read-modify-write procedure), then processing continues with element 604. Elements 604 and 606 are operable to read the current stored content of the virtual cluster requested by the host computer system. The current virtual cluster content is read by operation of element 604 into the compression data buffer 310 and then uncompressed into the virtual cluster buffer 314 as discussed above with respect to element 406 (and as detailed in FIGS. 5A and 5B). Element 606 is then operable to modify the portions of the virtual cluster buffer as requested by the host computer system write request. Processing then continues with element 614.

Elements 608, 610, and 612 are operable in the case of a full cluster write request from a host computer system as determined by operation of element 602. Element 608 is operable in response to a host computer system request to write a full cluster (replace the entire content of a stored virtual cluster). The host computer system supplied data representing the new data for the stored cluster is moved from the host computer system into virtual cluster buffer 314.

Element 610 is next operable to determine the state of the overflow bit 906 of FIG. 9 corresponding to the requested cluster in overflow table 904. If the corresponding overflow bit 906 is set indicating that some overflow blocks are associated with the physical cluster which contains the home block, then element 611 is operable to read the first physical block of the cluster. This access is required to determine the mapping information stored in the header data structure of the first physical block of the cluster. Processing then continues with element 614. If the overflow bit 906 is not set, indicating no overflow blocks are associated with the physical cluster, then element 612 is operable to deallocate all physical blocks of the physical cluster. Since no overflow blocks are associated with the cluster, the physical blocks may be easily deallocated by clearing the block allocation bits 902 in the block allocation table 900 of FIG. 9 for all physical blocks in the physical cluster. Processing then continues with element 616.

Element 614 is operable in response to element 606 for a partial cluster write operation, or element 611 for a full cluster write operation. The mapping information retrieved from the header data structure in the home block is used to determine which previously allocated physical blocks are to be deallocated. The home block and each additional physical block listed in the hdr_blocklist entry of the header data structure are deallocated by clearing the corresponding bit 902 in the block allocation table 900 of FIG. 9.

Element 616 is operable to compress the data in the virtual cluster 314 buffer into the compression data buffer 310. The data in the virtual cluster buffer 314 contains the new virtual cluster data to be stored on the physical storage modules. Element 616 also pre-pends an updated header data structure to the compression data buffer 310 to indicate the new compression data length in hdr_datalen. Element 618 is next operable to allocate new physical blocks to store the data in the compression data buffer 310 as the new cluster content. Operation of element 618 also updates the header data structure in the compression data buffer 310 to reflect the new hdr_blocklist entry of allocated additional physical blocks. Finally, after allocation of new physical blocks by element 618, the compressed data in compression data buffer 310 is written to the physical blocks allocated for storage of the cluster.

Element 618 allocates the first physical block (the home block) and as many additional physical blocks as are required to store the compressed data in the compression data buffer 310. Operation of element 618 also sets the overflow bits 906 in overflow table 904 for any physical cluster affected by the allocation of any overflow blocks required to store the cluster. As shown in FIG. 6, element 618 is always presumed to succeed. Operation of element 618 may fail if insufficient physical blocks are available (unallocated) to permit allocation of the required physical blocks for storing the newly compressed virtual cluster. In configuring the compressed virtual mass storage subsystem, it is advisable to estimate the net compression ratio conservatively to minimize the possibly of such an error arising. One of ordinary skill in the art will recognize that many standard error recovery techniques may be applied should this situation arise, including: retry of the operation after a timeout, return of an error message to the requesting host computer system, and others.

Mapping methods—block allocation search

When the methods of the present invention deallocate a physical block, the corresponding bit 902 in the block allocation table 900 of FIG. 9 is reset to indicate that the physical block is again available for allocation. When allocating a physical block for storage of a virtual cluster various methods may be employed to search for an available block.

The methods of the present invention attempt first to allocate an available physical block which is contained within the same physical cluster as the first physical block which stores the virtual cluster. This preference helps to locate additional physical blocks near the first physical block used to store the virtual cluster. This locality enhances the performance of the virtual mass storage subsystem because the physical cluster containing the first physical block is usually accessed when manipulating a virtual cluster in response to a host computer request. Additional physical blocks will tend to be located physically near the first physical block by virtue of being allocated within the same physical cluster when possible.

If an additional physical block cannot be allocated with the same physical cluster as the first physical block used to store the virtual cluster, then the methods of the present invention search the available physical blocks of other physical clusters as indicated by the block allocation table. An overflow block, (a block outside the physical cluster containing the home block), is then selected, as discussed below.

Figure 7:
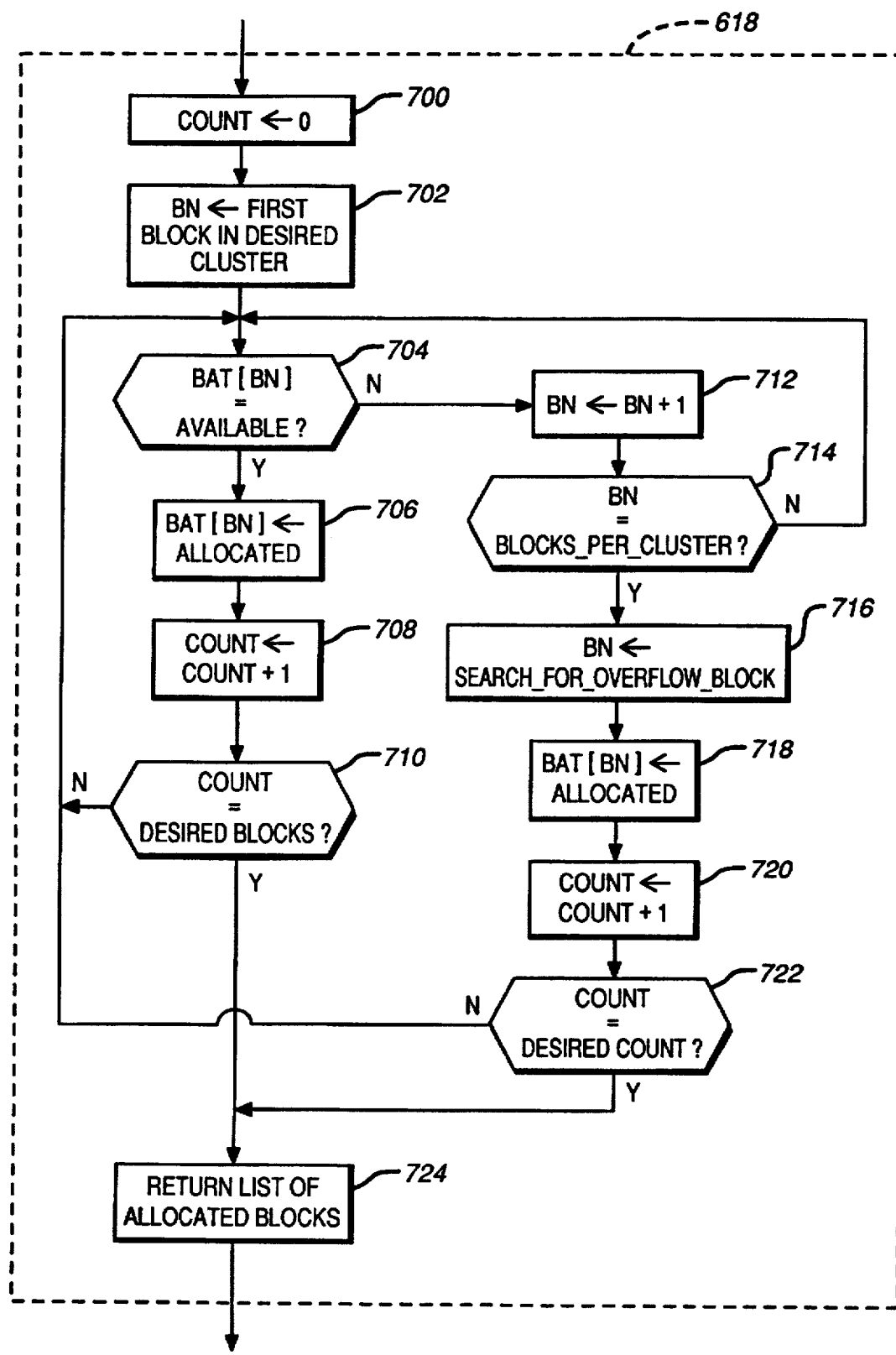
FIG. 7 is a flowchart depicting additional detail of the allocate blocks elements of FIG.6.

This block allocation method of the present invention is shown in the flowchart of FIG. 7. This method is referred to broadly by element 618 of FIG. 6 and shown in greater detail in FIG. 7. Element 700 and 702 of FIG. 7 are operable to initialize a count of the number of physical block allocated in the search method (initially zero) and the block number counter variable within the physical cluster (BN, initially the first block number in the desired cluster).

Element 704 tests whether the physical block at the current block number counter is available. If the block is available, then processing continues with elements 706 through 710. Specifically, element 706 marks the block as allocated in the block allocation table 312, element 708 increments the count of blocks allocated, and element 710 tests whether the desired number of additional blocks have been allocated. If a sufficient number of blocks have been allocated, then processing completes with operation of element 724 to return a list of the block numbers allocated by operation of this search method. If element 710 determines that additional blocks must be allocated, then processing continues by looping back to element 704.

If operation of element 704 determines that the block at the current block number counter (BN) is not available, then elements 712 and 714 are operable to increment the block number counter to the next block number in the cluster. If operation of element 714 determines that the block number is less than the number of physical blocks in a cluster, then processing continues by looping back to element 704 to test the next block in the desired cluster for availability. If element 714 determines that all physical blocks in the desired physical cluster are allocated (BN reaches the maximum number of physical blocks per cluster), then processing continues with elements 716 through 722 to allocate overflow blocks (blocks outside the desired physical cluster of blocks).

Element 716 is operable to search for an overflow block (a physical block outside the desired physical cluster—i.e. in another cluster but not allocated). Element 718 marks the block number of the overflow block as allocated in the block allocation table 312 bit corresponding to the overflow block number. Element 720 increments the count of blocks allocated, and element 722 tests whether the desired number of additional blocks have been allocated. If a sufficient number of blocks have been allocated, then processing completes with operation of element 724 to return a list of the block numbers allocated by operation of this search method. If element 722 determines that additional blocks must be allocated, then processing continues by looping back to element 704.

Note that as described above, the method of the present invention presumes that the search for an overflow block in element 716 will always return successfully with an available overflow block number. As discussed above with respect to FIG. 6, and again below with respect to FIG. 8, various methods for assuring that feature or for forcing retries will be apparent to those of ordinary skill in the art. It is presumed that the estimated net compression ratio is a conservative estimate to thereby reduce the probability of such an error occurring.

Mapping methods—overflow block search

The methods of the present invention locate a preferred overflow block by searching the block allocation table 312 for the "first" available physical block. The "first" available physical block is determined by the order in which the bits of the block allocation table 312 are searched. The physical cluster which contains the first physical block used to store the virtual cluster is referred to herein as the primary physical cluster. The table is searched in a circular manner beginning with the last physical block in the physical cluster previous to the primary physical cluster to the last block in the physical cluster which follows the primary physical cluster. The process repeats for the next to last physical block in the same clusters and so on until a free physical block is found. The following exemplary C language code describes the search technique:

```
adr_type search_for_overflow_block (long int desired_cluster)
{
#define MAX_CLUSTER 10        /* number of cluster in
                                 subsystem */
#define BLOCKS_PER_CLUSTER    /* number of blocks in a cluster */
#define make_address(bn,cn) (cn * BLOCKS_PER_CLUSTER + bn)
long int block_no,cluster_no;  /* counter variables */
extern BAT[MAX_CLUSTER*BLOCKS_PER_CLUSTER];
                              /* block allocation table */
/*
 * Search from last block in each cluster to second block in each cluster
 * (first block in each cluster is always reserved for storage of the mapping
 * info of each cluster).
 */
for (block_no = BLOCKS_PER_CLUSTER-1; --block_no > 0)
    /*
     * Search in a circular fashion from the previous cluster back
     * around to the current cluster.
     */
    for ( cluster_no = ((desired_cluster-1) >0) ?
                                 (desired_cluster-1):
                                 (MAX_CLUSTER-1);
                    cluster_no != desired_cluster;
                    cluster_no = (--cluster_no >0)?
                                 cluster_no:
                                 (MAX_CLUSTER-1)) {
        /*
         * If the BAT bit for the physical block indicates that
         * this block is available, we're done.
         */
        if (!BAT[make_address(block_no cluster_no)])
            break;      /* found a free block */
    }
    if (cluster_no != desired_cluster)
        break;          /* apparently found one! */
}
return(make_address(block_no cluster_no));
                              /* return physical block number */
}
```

One of ordinary skill in the art will note that many different algorithms for searching for an overflow block may be employed. The method presented above is the best presently known method in that it tends to allocate the latter physical blocks from other clusters to thereby permit other clusters to fill their respective lower block numbers first before requiring allocation of overflow blocks. In addition, one of ordinary skill in the art will recognize that the above method may be easily modified to continue searching for a desired number of available blocks and return a list of blocks located rather than to begin the search anew for additional overflow blocks.

Figure 8:
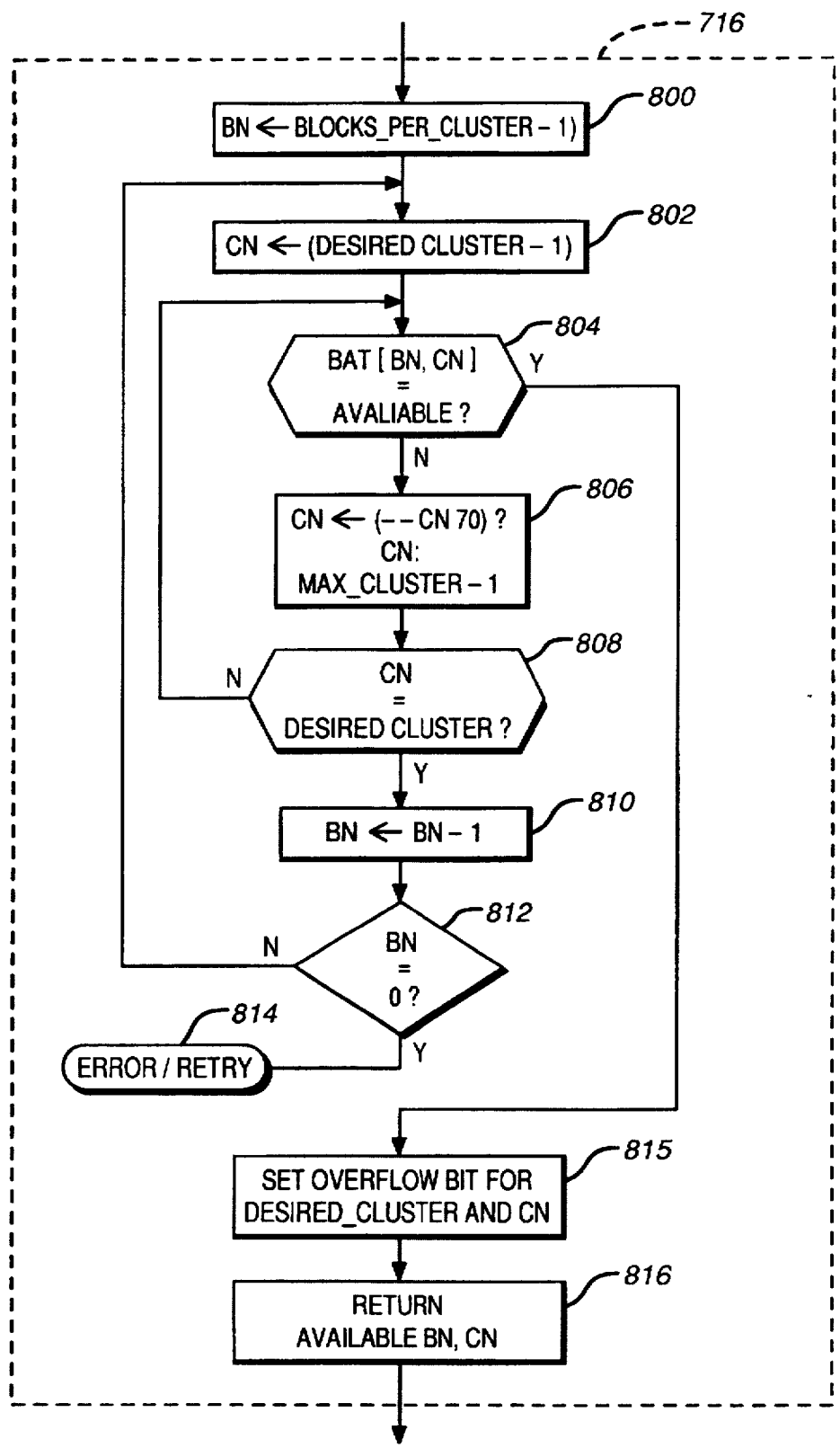
FIG. 8 is a flowchart which depicts additional details of the search for overflow blocks function used in FIG. 7.

The C language code segment above is shown in flowchart form in FIG. 8. Element 800 initializes the block number counter variable (BN) for the outermost loop to the last block number in a cluster (i.e. the number of blocks per cluster minus 1). Elements 802 through 812 are operated repetitively, decrementing the block number counter (BN) on each iteration until an available block is located or until all possible blocks have been checked and no available block is found.

Element 802 initializes the cluster number counter variable (CN) for the inner loop to the cluster number preceding the desired cluster ("modulo-like" arithmetic is applied to utilize the counter in a circular fashion). Elements 804 through 808 are operated repetitively, decrementing the cluster number counter variable (CN) with each iteration until an available block is located or until all possible clusters have been checked for an available block at the block number BN within each cluster.

Element 804 tests the block allocation table 312 bit for the current block number (BN) in the current cluster (CN) to determine if it is available for allocation. If the block is available, processing continues with element 815 to set the overflow bits 906 in the overflow table 904 of FIG. 9. The overflow bits 906 for the physical cluster corresponding to the desired cluster number and corresponding to the current cluster (CN) are set to indicate that an overflow block was allocated in cluster number CN for storage of data in the desired cluster. Element 816 is then operable to return the block number of the available physical block (BN) in the current physical cluster (CN). If the block is not available processing continue with element 806.

Elements 806 and 808 are operable to decrement the cluster number counter variable (CN) applying "modulo-like" arithmetic to utilize the counter in a circular manner. Element 808 tests whether the circular cluster number counter variable has reached the desired cluster number (circulated once to wrap back to itself). If the counter has so wrapped, then processing continues with element 810. If the counter has not yet wrapped, then the next previous physical cluster (cluster number CN) is tested for an available block at block number (BN) by looping back to repeat element 804.

Elements 810 and 812 are operable to decrement the block number counter variable (BN) in order to check all clusters for an available block at the next lower block number in each cluster. Element 810 decrements the counter and element 812 tests whether the block number has decremented to zero, the first block number in each cluster. If the block number counter variable is decremented to zero, there are no available overflow blocks in the virtual mass storage subsystem, all physical blocks are allocated. Note that the first block in each physical cluster is never allocated as an overflow block. Instead the first physical block in each cluster is reserved for its special mapping features in directly calculating the map from a virtual block or cluster number to the corresponding first physical block. If no overflow blocks are available, then element 814 is operable to perform appropriate error recovery or retry procedures. For example, a retry procedure may be to wait a period of time and retry the search technique. In the alternative, an error procedure may be invoked to simply inform the requesting host computer system of the error condition encountered during the write operation. One of ordinary skill in the art will recognize many different means for error recovery in this condition which within the spirit and scope of the claimed invention.

Mapping methods—re-initialization

In the preferred embodiment of the methods of the present invention, memory used to store the block allocation table 312, and the overflow table 316, are stored in non-volatile memory devices to assure the integrity of the virtual to physical block mapping and allocation structures are maintained through power cycles and other failures of the virtual mass storage subsystem. The actual block allocation and mapping information is stored in the header data structure in the home block of each physical cluster. In this sense, the virtual mass storage subsystem of the present invention is fail-safe (it may be recovered from the information permanently stored on the physical storage modules). To help assure the integrity of the subsystem, the block allocation table 312 and the overflow table 316 may be rebuilt from inspection of the header data structures stored in the home block of each physical cluster.

The block allocation table 312 and overflow table 316 may be rebuilt every time the virtual mass storage subsystem is re-initialized at power-on or by host computer command. The tables are first cleared to all zeros then the home block of each physical cluster is read to retrieve the header stat structure. The first physical block is allocated if the hdr__datalen field of the header data structure in the first block indicates a non-zero compressed data length. If the first block is allocated, then the mapping information in the hdr__blocklist field of its header is inspected to determine what other blocks are allocated to the stored cluster. The bit 902 in the block allocation table 900 corresponding to each physical block allocated to storage of the physical cluster is set. If the mapping information indicates that overflow blocks are allocated by the stored cluster then the appropriate overflow bits are set (the bit for the cluster which allocated the overflow block and for the cluster in which the overflow block is physically contained). After the first block for each physical cluster has been so processed, the overflow table 316 and the block allocation table 312 are reinitialized to proper values.

While the invention has been illustrated and described in detail in the drawings and the foregoing description, such illustration and description is to be considered as exemplary and not restrictive in character, it being understood that only the preferred embodiment has been shown and described and that all changes and modifications that come within the spirit of the invention are desired to be protected. In particular, various equivalent data structures may be used to represent the block allocation tables, the overflow tables, and the header data structure in the first block of the cluster. Or for example, the first or any other block of a cluster may be reserved for mapping from virtual to physical addresses by use of a simple calculation. Or by further example, other block allocation methods may be employed to select the additional blocks allocated to the storage of a particular virtual cluster, or various data compression methods may be employed with the mapping methods of the present invention, or no data compression may be used.

What is claimed is:

1. In a virtual mass storage subsystem having a plurality of physical storage blocks, a method for storing virtual clusters received from a host computer system in said physical storage blocks of said mass storage subsystem, said method comprising the steps of:

(a) mapping a virtual cluster number associated with a received virtual cluster to a first physical storage block number corresponding to a first physical storage block of a plurality of physical storage blocks corresponding to a physical cluster, wherein said mapping consists essentially of an arithmetic calculation devoid of memory table lookup functions;

(b) compressing said virtual cluster to generate a compressed physical cluster, (c) identifying available physical storage blocks of said plurality of physical storage blocks in said physical cluster;

(d) storing a portion of said compressed physical cluster in said available physical storage blocks of said physical cluster wherein said available physical storage blocks includes said first physical storage block;

(e) determining whether a remaining portion of said compressed physical cluster can not be stored in said available physical storage blocks; and (f) storing said remaining portion in additional physical storage blocks of another physical cluster.

2. The method of claim 1 wherein the step of identifying comprises the steps of:

reading said first physical storage block of said physical cluster to retrieve a header data structure therein; and inspecting said header data structure to identify said available physical storage blocks in said physical cluster.

3. The method of claim 2, further comprising the step of:

updating said header data structure to reflect non-availability of said available physical storage blocks in said physical cluster in response to the step of storing said portion of said compressed physical cluster in said available physical storage blocks.

4. The method of claim 1 further comprising the step of:

providing a free block data structure in a memory associated with said mass storage subsystem, said free block data structure indicating an available status corresponding to each physical storage block in said mass storage subsystem.

5. The method of claim 4 wherein said free block data structure comprises an array of bits, wherein each bit corresponds to one of said physical storage blocks, and wherein one value of each bit indicates that the corresponding physical storage block is available and the other value of said each bit indicates that the corresponding physical storage block is unavailable.

6. The method of claim 4 further comprising the steps of:

(i) locating physical storage blocks which have a corresponding available status indication in said free block data structure; and (ii) marking the available physical storage blocks located by operation of step (i) as unavailable in said free block data structure.

7. The method of claim 6 wherein said physical storage blocks are organized into a plurality of physical clusters, each of said physical clusters containing a predetermined number of said physical storage blocks, and wherein step (i) further comprises the steps of:

(i.1) locating physical storage blocks in the physical cluster which also contains said first physical storage block which have a corresponding available status indication in said free block data structure;

(i.2) determining that an insufficient number of physical storage blocks were located by operation of step (i.1) to permit storage of a header data structure and said virtual cluster; and (i.3) locating, responsive to a determination that insufficient storage blocks were located by operation of step (i.2), additional physical storage blocks in physical clusters which do not contain said first physical storage block and which have a corresponding available status indication in said free block data structure.

8. The method of claim 7 further comprising the step of:

providing an overflow data structure in a memory associated with said mass storage subsystem, said overflow data structure indicating an overflow status corresponding to each physical cluster in said mass storage subsystem.

9. The method of claim 8 wherein said free block data structure comprises an array of bits, wherein each bit corresponds to one of said physical clusters, and wherein one value of each bit indicates that the corresponding physical cluster has an overflow status and the other value of said each bit indicates that the corresponding physical cluster does not have an overflow status.

10. The method of claim 8 further comprising the steps of:

setting, responsive to a determination that insufficient storage blocks were located by operation of step (i.2), the overflow status in said overflow data structure corresponding to the physical cluster which contains said first physical block; and setting, responsive to locating additional physical storage blocks in physical clusters in step (i.3), the overflow status in said overflow data structure corresponding to each of said additional physical clusters located by operation of step (i.3).

11. In a virtual mass storage subsystem having a plurality of physical storage blocks, a method for retrieving virtual clusters previously stored in the physical storage blocks of said mass storage subsystem, said method comprising the steps of:

(a) receiving a request from a host computer system to retrieve a virtual cluster identified by a virtual cluster number;

(b) mapping said virtual cluster number to a first physical storage block number corresponding to a first physical storage block at which said virtual cluster was previously stored, wherein said mapping consists essentially of an arithmetic calculation to the exclusion of memory table lookup functions;

(c) reading the physical cluster containing said first physical storage block to retrieve a header data structure contained in said first physical storage block and having information regarding all physical storage blocks corresponding to said virtual cluster in said physical cluster;

(d) determining whether additional physical storage blocks need be read to retrieve the virtual cluster requested by said host computer system;

(e) skipping to step (h) responsive to a determination by step (d) that no additional physical storage blocks need be read;

f) determining, from said header data structure, additional physical storage block numbers corresponding to additional physical storage blocks used to store said virtual cluster and said header data structure;

(g) reading said additional physical storage blocks used to store said virtual cluster;

(h) decompressing compressed data contained in the read physical storage blocks to regenerate said virtual cluster; and (i) returning said virtual cluster to said host computer system.

12. The method of claim 11 wherein said physical storage blocks are organized into a plurality of physical clusters, each of said physical clusters containing a predetermined number of said physical storage blocks, wherein step (c) further includes a step of reading all physical storage blocks contained in the physical cluster which contains said first physical storage blocks, and wherein step (g) further includes a step of reading all said additional physical storage blocks not contained in said physical cluster which contains said first physical storage block.

13. The method of claim 12 further comprising the step of:

providing an overflow data structure in a memory associated with said mass storage subsystem, said overflow data structure indicating an overflow status corresponding to each physical cluster in said mass storage subsystem.

14. The method of claim 13 wherein said overflow data structure comprises an array of bits, wherein each bit corresponds to one of said physical clusters, and wherein one value of each bit indicates that the corresponding physical cluster has an overflow status and the other value of said each bit indicates that the corresponding physical cluster does not have an overflow status.

15. The method of claim 13 wherein step (d) further comprises the steps of:
   (d.1) determining that no additional physical storage blocks need be read responsive to a determination that the physical cluster containing said first physical storage block does not have an overflow status; and
   (d.2) determining that additional physical storage blocks need be read responsive to a determination that the physical cluster containing said first physical storage block has an overflow status.

16. A compressed virtual storage subsystem for storage of a virtual cluster in said compressed virtual storage subsystem, said subsystem comprising:
   at least one storage device containing a plurality of physical storage clusters, each of said plurality of physical storage clusters including a plurality of physical storage blocks;
   a storage controller coupled to said at least one storage device and coupled to a host system for processing an I/O write request received from said host system wherein said storage controller includes;
   means for compressing data of said virtual cluster to generate a compressed cluster;
   means for determining a required number of physical storage blocks to store said compressed cluster in said storage medium;
   mapping means for calculating a physical cluster number from a virtual cluster number associated with said virtual cluster;
   means for identifying available physical storage blocks in said desired physical storage cluster from information in a header portion of a first physical storage block of said physical storage cluster; and
   means for storing said compressed cluster in the identified available physical storage blocks of said desired physical storage cluster.

17. The subsystem of claim 16 further comprising:
   a memory having stored therein a free block data structure, said free block data structure including a stored indicator corresponding to an available status for each physical storage block in said mass storage subsystem.

18. The system of claim 16 further comprising:
   a memory having stored therein an overflow data structure, said overflow data structure having an overflow status indicator corresponding to each physical cluster in said mass storage subsystem.

19. A compressed virtual storage subsystem for retrieval of a virtual cluster previously stored in said compressed virtual storage subsystem, said subsystem comprising:
   at least one storage device containing a plurality of physical storage clusters, each of said plurality of physical storage clusters including a plurality of physical storage blocks;
   a storage controller coupled to said at least one storage device and coupled to a host system for processing an I/O write request received from said host system wherein said storage controller includes:
   mapping means for calculating a physical cluster number from a virtual cluster number associated with said virtual cluster;
   means for identifying physical storage blocks in said desired physical storage cluster containing portions of said virtual cluster from information in a header portion of a first physical storage block of said physical storage cluster;
   means for retrieving compressed data from the identified physical storage blocks of said desired physical storage cluster; and
   means for decompressing the compressed data.

20. The subsystem of claim 19 further comprising:
   a memory having stored therein a free block data structure, said free block data structure including a stored indicator corresponding to an available status for each physical storage block in said mass storage subsystem.

21. The system of claim 19 further comprising:
   a memory having stored therein an overflow data structure, said overflow data structure having an overflow status indicator corresponding to each physical cluster in said mass storage subsystem.

22. In a compressed virtual storage subsystem having a storage medium consisting of a plurality of physical storage clusters each having a plurality of physical storage blocks, a method for storing a virtual cluster provided by an attached host system comprising the steps of:
   compressing data of said virtual cluster to generate a compressed cluster;
   determining a required number of physical storage blocks to store said compressed cluster in said storage medium;
   mapping a virtual cluster number associated with said virtual cluster into a physical cluster number associated with a desired physical storage cluster wherein the mapping step consists essentially of arithmetic calculations devoid of memory lookup functions;
   identifying available physical storage blocks in said desired physical storage cluster; and
   storing said compressed cluster in the identified available physical storage blocks of said desired physical storage cluster.

23. The method of claim 22 further comprising the steps of:
   determining that the identified available physical storage blocks are insufficient to store the entirety of said compressed cluster leaving a remaining portion of said compressed cluster;
   identifying additional available physical storage blocks in another physical storage cluster; and
   storing said remaining portion of said compressed cluster in said additional available physical storage blocks.

24. The method of claim 23 further comprising the steps of:
   providing an overflow table structure having an entry for each of said plurality of physical storage clusters wherein said entry includes indicia that a corresponding physical storage cluster contains overflow blocks associated with a different physical storage cluster; and
   marking an entry corresponding to said another physical storage cluster in said overflow table structure to indicate that said another physical storage cluster contains overflow blocks associated with said desired physical storage cluster.

25. The method of claim 24 wherein the step of identifying available physical storage blocks in said desired physical storage cluster includes the steps of:

determining whether the entry corresponding to said desired physical storage cluster in said overflow table structure indicates that said desired physical storage cluster contains overflow blocks associated with a different physical storage cluster;

determining whether said I/O request is for storage of an entire virtual cluster;

determining that all of said plurality of physical storage blocks of said desired physical storage cluster are available in response to the determination that said entry corresponding to said desired physical storage cluster in said overflow table structure indicates that said desired physical storage cluster contains no overflow blocks and the determination that said I/O request is for storage of an entire virtual cluster.

26. In a compressed virtual storage subsystem having a storage medium consisting of a plurality of physical storage clusters each having a plurality of physical storage blocks, a method for retrieving a compressed virtual cluster provided by an attached host system comprising the steps of:

mapping a virtual cluster number associated with said compressed virtual cluster into a physical cluster number associated with a desired physical storage cluster wherein the mapping step consists essentially of arithmetic calculations devoid of memory lookup functions;

reading said physical storage cluster wherein said physical storage cluster includes a header data structure in a first physical storage block of the plurality of physical storage blocks of said physical storage cluster and wherein;

determining from said header data structure which of said plurality of physical storage blocks correspond to said compressed virtual storage;

decompressing said virtual cluster from data stored in said plurality of physical blocks corresponding to said compressed virtual cluster; and returning the decompressed virtual cluster to said host system.

27. The method of claim 26 further comprising the steps of:

determining whether additional physical storage blocks of another physical storage cluster correspond to said compressed virtual cluster, wherein the step of decompressing further comprises the step of decompressing data stored in said additional physical storage blocks corresponding to said compressed virtual cluster.

28. The method of claim 27 further comprising the steps of:

inspecting an overflow table structure having an entry for each of said plurality of physical storage clusters to determine whether said physical storage cluster is associated with overflow blocks corresponding to another physical cluster, wherein each said entry includes indicia that a corresponding physical storage cluster contains overflow blocks associated with a different physical storage cluster; and reading said overflow blocks associated with said physical storage cluster.

* * * * *